(12) United States Patent
Beckman

(10) Patent No.: US 9,053,578 B2
(45) Date of Patent: Jun. 9, 2015

(54) TECHNIQUES FOR CAPTURING AND GENERATING IMAGES AND REPORTS WITH IMAGE ELEMENTS AND LIVE DATA

(76) Inventor: Christopher V. Beckman, New York, NY (US)

( * ) Notice: Subject to any disclaimer, the term of this patent is extended or adjusted under 35 U.S.C. 154(b) by 704 days.

(21) Appl. No.: 13/329,190

(22) Filed: Dec. 16, 2011

(65) Prior Publication Data

US 2013/0156318 A1 Jun. 20, 2013

(51) Int. Cl.
*G06K 9/00* (2006.01)
*G06T 11/20* (2006.01)

(52) U.S. Cl.
CPC .................................. *G06T 11/206* (2013.01)

(58) Field of Classification Search
None
See application file for complete search history.

(56) References Cited

U.S. PATENT DOCUMENTS

| | | | | |
|---|---|---|---|---|
| 6,657,647 | B1 * | 12/2003 | Bright | 715/856 |
| 7,853,296 | B2 | 12/2010 | Yu et al. | |
| 8,331,566 | B1 * | 12/2012 | Foote et al. | 380/255 |
| 8,887,085 | B1 * | 11/2014 | Cox et al. | 715/786 |
| 2001/0044809 | A1 * | 11/2001 | Parasnis et al. | 707/513 |
| 2002/0056100 | A1 * | 5/2002 | Shimomura et al. | 725/39 |
| 2003/0035002 | A1 * | 2/2003 | Moles | 345/760 |
| 2009/0226093 | A1 * | 9/2009 | Guo et al. | 382/190 |
| 2012/0030305 | A1 * | 2/2012 | Marquess et al. | 709/213 |

OTHER PUBLICATIONS

McKenna et al. (2000) "Tracking groups of people." Computer Vision and Image Understanding, vol. 80 pp. 42-56.*
Stephen Herbert, "The Phenakistiscope, and Stroboscopic Disc," retrieved from the internet at http://www. stephenherbert.co.uk/phenakPartOne.htm, retrieved on Apr. 1, 2013; 9 pages.
Library of Congress,"History of Edison Motion Pictures," retrieved from the internet at http://memory.loc.gov/ammem/edhtml/edmvhist.html#O, retrieved on Apr. 1, 2013; 3 pages.
Thomson Reuters, "Thomson Reuters Stock Reports+ Fact Sheet," retrieved from the internet at http://thomsonreuters.com/content/financial/pdf/s_and_t/stock_reports_plus.pdf, retrieved on Apr. 1, 2013; 1 page.
Thomson Reuters, "Thomson Reuters Company-in-Context Report: Interdigital Inc. PA," dated Dec. 21, 2010, retrieved from the internet at http://wirelessledger.com/IDCCThompsonReutersReport.pdf, retrieved on Apr. 1, 2013; 6 pages.

(Continued)

*Primary Examiner* — Barry Drennan

(57) ABSTRACT

Techniques for efficiently capturing, generating and distributing realistic images and dynamic reports with live sources are provided. Among other aspects, the system includes a user interface with identifier tags to create and manipulate dynamic and fixed representational image elements to create high resolution, seamless composite images or image streams with low processing and storage requirements, from databases or other sources. The identifier tags may be provided with Relational Aspects, including physical models governing image elements and their 3-D subjects. Image output may be in digital, analog or direct representational formats, and a new format combining features of each. Element Seeding or Borrowing may be implemented to further enhance elements of the image or report composites.

20 Claims, 12 Drawing Sheets

(56) References Cited

OTHER PUBLICATIONS

Sony Ericsson Blog, "Sony Ericsson C510—First Mobile Phone with Smile Shutter Technology," dated Jan. 2009, retrieved from the internet at http://testozavr.blogspot.com/2009/01/sony-ericsson-c510-first-mobile-phone.html, retrieved on Apr. 1, 2013; 3 pages.

Jacob Rosenberg, Adobe Systems Incorporated, "A Change of Scenery is Easy Using Green Screen Techniques," dated Nov. 1, 2004, retrieved from the internet at http://www.adobe.com/designcenter-archive/premiere/articles/ppro15sdgrnscren.html, retrieved on Apr. 1, 2013; 9 pages.

Steve Guttenberg, CNET, "The Audiophiliac: The Analogue/Digital Audio Smackdown," dated Jun. 29, 2010, retrieved from the internet at http://news.cnet.com/8301-13645_3-20009082-47.html, retrieved on Apr. 2, 2013; 6 pages.

Matt Pharr, Greg Humphreys, "Physically Based Rendering: From Theory to Implementation: Chapter 7: Sampling and Reconstruction," retrieved from the internet at http://graphics.stanford.edu/~mmp/chapters/pbrt_chapter7.pdf, retrieved on Apr. 3, 2013; 89 pages.

Robert J. Marks II (Editor), "Advanced Topics in Shannon Sampling and Interpolation Theory", 1993, Springer-Verlag, New York, NY, USA.

Hedgecoe, J., "The New Manual of Photography", 2003, pp. 28-35, DK Publishing, Inc., New York, NY, USA.

\* cited by examiner

| | | 1983 | 1996 | 2011 | 1983 Exp. | 1996 Exp. | 2011 Exp. |
|---|---|---|---|---|---|---|---|
| Continent | Report Date | | | | | | |
| South America | 8/5/12 | 70% | 77% | 85% | 64 | 65 | 67 |
| Continental North America | 6/5/12 | 71% | 76% | 85% | 74.4 | 76 | 76.3 |
| Africa | 5/5/12 | 55% | 61% | 67% | 52 | 53.8 | 56 |
| Australia | 5/4/12 | 78% | 86% | 94% | 75 | 78.4 | 81.8 |

TECHNIQUES FOR CAPTURING AND GENERATING IMAGES AND REPORTS WITH IMAGE ELEMENTS AND LIVE DATA

FIELD OF THE INVENTION

The present invention relates to the field of report generation and imaging. The present invention also relates to information databases.

BACKGROUND

In the visual arts, a series of related images or reports may be used for a variety of purposes. For example, in the motion picture industry, a series of related images taken at time intervals are later projected to generate the illusion of motion to a viewer. In the field of financial reporting, a series of related images (such as analytical reports) may be required to depict financial changes in a particular industry or company, or changes from one company to another or from one area to another. Regardless of the field, traditionally, a new image of comparable or similar size may be recorded and projected for certain intervals taken.

In the field of photography, the detection and treatment of shapes within an image or series of images has been sought. For example, certain technology by Sony Corporation permits the recognition of human faces and smiles by cameras. Also in the motion picture industry, the projection of background images, further away from a foreground subject, into composite images is possible. This is often accomplished by use of a backdrop color (as in "green-screen" technology) which a system is able to replace with a desired background image, which generally does not interfere with the foreground subject in a recorded composite image including the two.

More recently, augmented reality systems have been developed, which permit the synthesis of computer generated ("CG") images with captured images from photographic sources, with the aid of marker objects recognized by the system which are used as a location point for projecting a computer-generated image. These systems result in the generation of composite images with both real-world and CG elements.

The present invention relates to techniques, systems and methods for more efficiently and more richly capturing, recording, transmitting, projecting and viewing both fixed and dynamic elements, image aspects or components (which terms can be used interchangeably in this application) of related images. The present invention also relates to new image formats, that may not have intervals or gaps and that may not rely on the persistence of vision for the appearance motion.

Generally speaking, images, sound and other sensed phenomena have been captured in digital formats and media, which have had several advantages over analog storage formats and media, including relative immunity to degradation and easy computation by digital computers. However, digital formats have the disadvantage of fixed and uniform stepped intervals, which noticeably reduces the quality of playback, projection and experience, particularly at high frequencies of sound or light waves, because higher frequency waves are thereby expressed with a more incomplete waveform shape than lower frequencies. In response, several digital-to-analog converters have been introduced into the market, which attempt to "smooth" the stepped intervals with interpolated data between the bits of digital data. But digital-to-analog conversion causes data degradation and, in any event, can never accurately restore the original form of the phenomenon recorded.

SUMMARY OF THE INVENTION

Techniques for generating images quickly, efficiently and with greater verisimilitude are provided. A preferred embodiment uses computer hardware for capturing and generating images with dynamic and fixed representational elements (such as picture and text), metadata components and Relational Aspects (defined further below) with other elements, which may be associated with identified data of a database. The data and Relational Aspects may themselves be dynamic, and the data, Relational Aspects and representational elements may be dynamic in series. In certain aspects of the invention, dynamic elements of generated images, or their CG 3-D subjects, may be descriptively or physically modeled, and may reposition or otherwise affect other elements of the generated images, for example, at particular dynamic coordinates, at the user's direction and according to differences in the dynamic elements over time. Certain elements, such as changes in texture, lighting and other representational or other data and aspects may be recorded and tolerated (in fixed element detection) and exerted (in generation onto fixed and dynamic elements in the images generated), and may involve Element Seeding or Borrowing (defined further below) and continuous changes throughout an image stream, for example, as defined by analog media, calculus derivatives and integrals or vectors. Management of the system may be by user interface which may entail dynamic templating with database and Relational Aspect creation and association, fixed and dynamic tagging, component selection and positioning, 3-dimensional ("3-D") and 2-dimensional ("2-D") element, affector and subject placement and definition and treatment, and other image generation and capture parameters.

Within the context of this application, unless otherwise indicated, the following terms have the specific meaning described herein:

"Image" means a visual or other representation or communication involving, at least in part, a tangible medium, where it is transmitted and/or recorded (and also refers to the recording itself), and does not necessarily, but may, include associated non-representational or partially representational elements, such as metadata and internal and external Relational Aspects, (for example, Seed or Borrowed Elements, defined further in this application, below, and such as an image boundary deformation characteristic and acceleration second derivative of position of a subject object, respectively). Images may be 2-, 3-dimensional ("2-D" or "3-D") or otherwise multidimensional and may refer to composites of other images and non-visual phenomena, such as other electromagnetic radiation, sound waves, olfactory, or tactile media. Thus, in addition to traditional visual images, an "image," as meant in this application, may refer to representations, communications, transmissions and recordings that may or may not be rendered depicted visually, such as a sound, smell, UV photograph or 3-dimensional tactile representation. When used in this application and its claims, this and every other term defined in this application means each and every sense or part of a sense individually, together and in any combination, as if so set forth from the text of the definitions, such as this, in the definition sections of this application.

"Dynamic Element" means a part (including, but not limited to, any size, parameter, shape, contour, location, sound, timbre, color, temperature, filter, vibration, tone, effect, texture, luminosity, electromagnetic radiation spectra, modulation or other emission or other aspect of that part), component, attribute, characteristic, aspect, filter or other effect of, or other thing substantially impacting or affecting, an image that may change over the course of a function of the image or image stream or from image-to-image in a series of images (or part of such a series) of which the image is a part, or that may change as a result of data changing in an associated database. In addition to Representational Dynamic Elements, Dynamic Elements may include Non-Representational Elements, such as metadata and Relational Aspects, as further defined in this application. Image Elements include their alternate storage and transmission forms, for example as encoded signals and/or other storage or transmission media and formats, that may require further manipulation, translation, rendering, projection or other treatment to be experienced by a user as a part of an image, as further defined in this application.

"Dynamic Representational Element" means a Dynamic Element, as further defined in this application, which relates to or affects the representation or representational nature of an image or understanding or cognition by one experiencing the image or representation of the image.

"Fixed Element" means a part (including, but not limited to, any size, parameter, shape, contour, location, sound, timbre, color, temperature, filter, vibration, tone, effect, texture, luminosity, electromagnetic radiation spectra, modulation or other emission or other aspect of that part), component, attribute, characteristic, aspect, filter or other effect of, or other thing substantially impacting or affecting, an image that remains constant or at least relatively constant or constant in some respect within a parameter over the course of a function of the image or image stream or from image-to-image in a series of images (or part of such a series) of which the image is a part, or that remains constant or at least relatively constant or constant in some respect as data changes in an associated database. In addition to Representational Fixed Elements, Fixed Elements may include Non-Representational Elements, such as metadata and Relational Aspects, as further defined in this application. Image Elements include their alternate storage and transmission forms, for example as encoded signals and/or other storage or transmission media and formats, that may require further manipulation, translation, rendering, projection or other treatment to be experienced by a user as a part of an image, as further defined in this application.

"Fixed Representational Element" means a Fixed Element, as further defined in this application, which relates to or affects the representation or representational nature of an image or understanding or cognition by one experiencing the image or representation of the image.

"Semi-Dynamic Element" means a part (including, but not limited to, any size, parameter, shape, contour, location, sound, timbre, color, temperature, filter, vibration, tone, effect, texture, luminosity, electromagnetic radiation spectra, modulation or other emission or other aspect of that part), component, attribute, characteristic, aspect, filter or other effect of, or other thing substantially impacting, an image that may change in some way or respect over the course of a function of the image or image stream or from image-to-image in a series of images (or part of such a series) of which the image is a part, or that may change in some way or respect as a result of data changing in an associated database, but, that may also remain constant or at least relatively constant or constant in some respect within a parameter over the course of a function of the image or image stream or from image-to-image in a series of images (or part of such a series) of which the image is a part, or that may remain constant or at least relatively constant or constant in some respect as data changes in an associated database. In addition to Representational Semi-dynamic Elements, Semi-dynamic Elements may include Non-Representational Elements, such as metadata and Relational Aspects, as further defined in this application. Image Elements include their alternate storage and transmission forms, for example as encoded signals and/or other storage or transmission media and formats, that may require further manipulation, translation, rendering, projection or other treatment to be experienced by a user as a part of an image, as further defined in this application.

"Semi-Dynamic Representational Element" means a Semi-dynamic Element, as further defined in this application, which relates to or affects the representation or representational nature of an image or understanding or cognition by one experiencing the image or representation of the image.

"Relational Aspect" means some relationship which may be sensed, understood, recorded and/or implemented between an image or Dynamic Element, Fixed Element or Semi-Dynamic Element thereof and another such image or element or external factor, for examples, a 3-dimensional subject similar to that represented in an image, which may be 2-dimensional, or a change in news relevant to the content of a report. Relational aspects may be multi-variate, with complex application functions and all image elements may be set to have multiple Relational Aspects with every other image element.

"Interactive Element" "Interactive Aspect" or "Interactive Parameter," in addition to the senses of their individual words, each mean a part (including, but not limited to, any size, parameter, shape, contour, location, sound, timbre, color, temperature, filter, vibration, tone, effect, texture, luminosity, electromagnetic radiation spectra, modulation or other emission or other aspect of that part), component, attribute, characteristic, aspect, filter or other effect of, or other thing substantially impacting or affecting, an image that may be affected, changed, added to or taken away from or, at least in part, the result of at least one Relational Aspect.

"Variation Toleration" means a degree, amount or pattern of change, or a degree, amount or pattern of change of such change, in some part (including, but not limited to, any size, parameter, shape, contour, location, sound, timbre, color, temperature, filter, vibration, tone, effect, texture, luminosity, electromagnetic radiation spectra, modulation or other emission or other aspect of that part), component, attribute, characteristic, aspect, filter or other effect of, or other thing substantially impacting, an image or external factor that, if sensed or otherwise understood or established as existing, will not interfere with the system determining or defining an Element or Representational Element, including defining whether such an Element or Representational element is Dynamic or Fixed, assigning a unique identifier to the element and determining whether to exert other elements or treatments or affects upon such element.

"Element Seeding or Borrowing" refers to a system according to aspects of the present invention taking and applying elements, which may be dynamic and from a variable or even live source and infinitely so dynamic and variable, and which may be previously unrelated to the system and may be an ambient source. For example, rather than store and recall complete dynamic texture information for a Fixed Element, a texture template tag may partially reflect actual ambient texture, which may or may not ever be digitally or otherwise stored separately within the system.

BRIEF DESCRIPTION OF THE DRAWINGS

FIG. 4 depicts an example database associated with image elements in accordance with aspects of the present invention, corresponding with the image series of FIGS. 1-3.

DETAILED DESCRIPTION OF THE DRAWINGS

Figure 1:
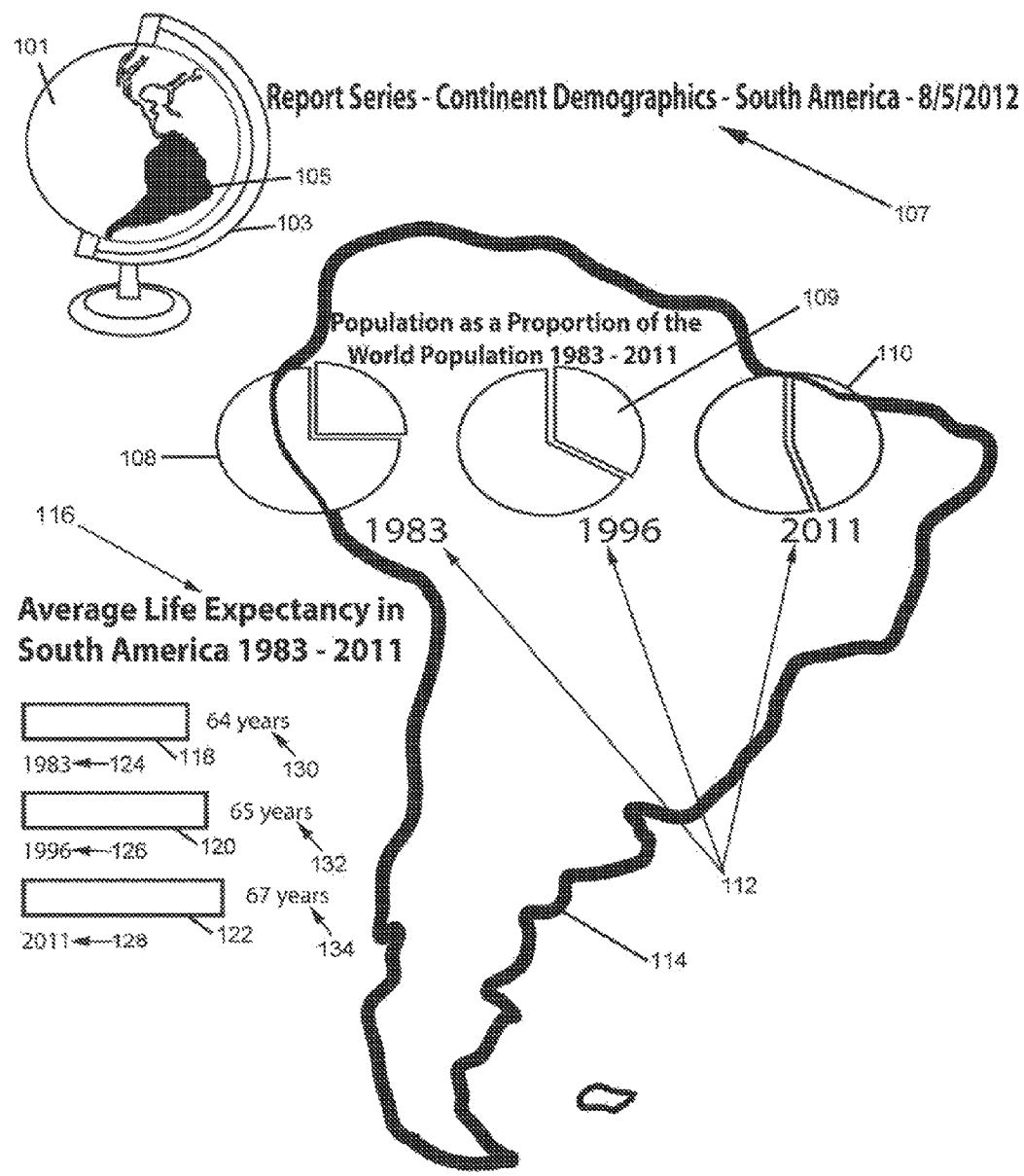
FIG. 1 depicts example representational elements of an image from a series of related images, as might be treated or generated by aspects of the present invention.

FIG. 1 depicts example representational elements of an image from a series of related images, as might be treated or generated by aspects of the present invention. The representational elements of FIG. 1 show a report regarding human demographics of a continent of the Earth. Image element 101 is such a representational element, and represents and conveys to a viewer the impression of a globe depicting the Earth, with a representational element of a bracket stand 103, and coloration or texturization representational element 105 (specifically, depicting and highlighting the continent of South America). As will be explained in greater detail below, coloration or texturization representational element 105 impacts image element 101, according to certain aspects of the present invention. Heading text representational element 107 explains the overall subject of the image to a viewer. Pie chart representational element 108 represents and conveys to a viewer the impression of a pie chart showing demographic data. Another pie chart representational element 110 represents and conveys to a viewer the impression of a chart similar to 108, but showing demographic data from another year. Pie chart year text representational elements 112 are situated near pie chart representational elements 108-110, explaining to the viewer which year the data of each pie chart element demonstrates. A background representational element 114 provides to a viewer the concept that the entire image relates to the continent of South America, by depicting a rough outline of the shape of the continent of South America. Due to aspects of the invention that will be explained in greater detail below, background representational element 114 repositions or otherwise affects pie chart elements 108 and 110 by showing through it, at least to some degree, changing some of the representational aspects of element 114 through Relational Aspect settings or other settings set by the system or user.

Bar infographic heading text representational element 116 explains the significance of certain elements that appear below it, namely horizontal bar representational elements 118-122, which depict to a viewer a visual demonstration of the relative amount and change in life expectancy in South America in certain years. Textual year indicator representational elements 124-128 set forth those years for a viewer. Life expectancy in years textual representational elements 130-134 set forth for the viewer the number of years corresponding with horizontal bar representational elements 118-122. Specifically, life expectancy in years textual representational element 130 sets forth for the viewer the number of years corresponding with horizontal bar representational element 118, while textual representational elements 132 and 134 correspond with horizontal bar representational elements 120 and 122, respectively. As will be explained in greater detail, below, horizontal bar representational elements 118-122 impacted life expectancy in years textual representational elements 130-134 by determining their final position in the image.

Figure 2:
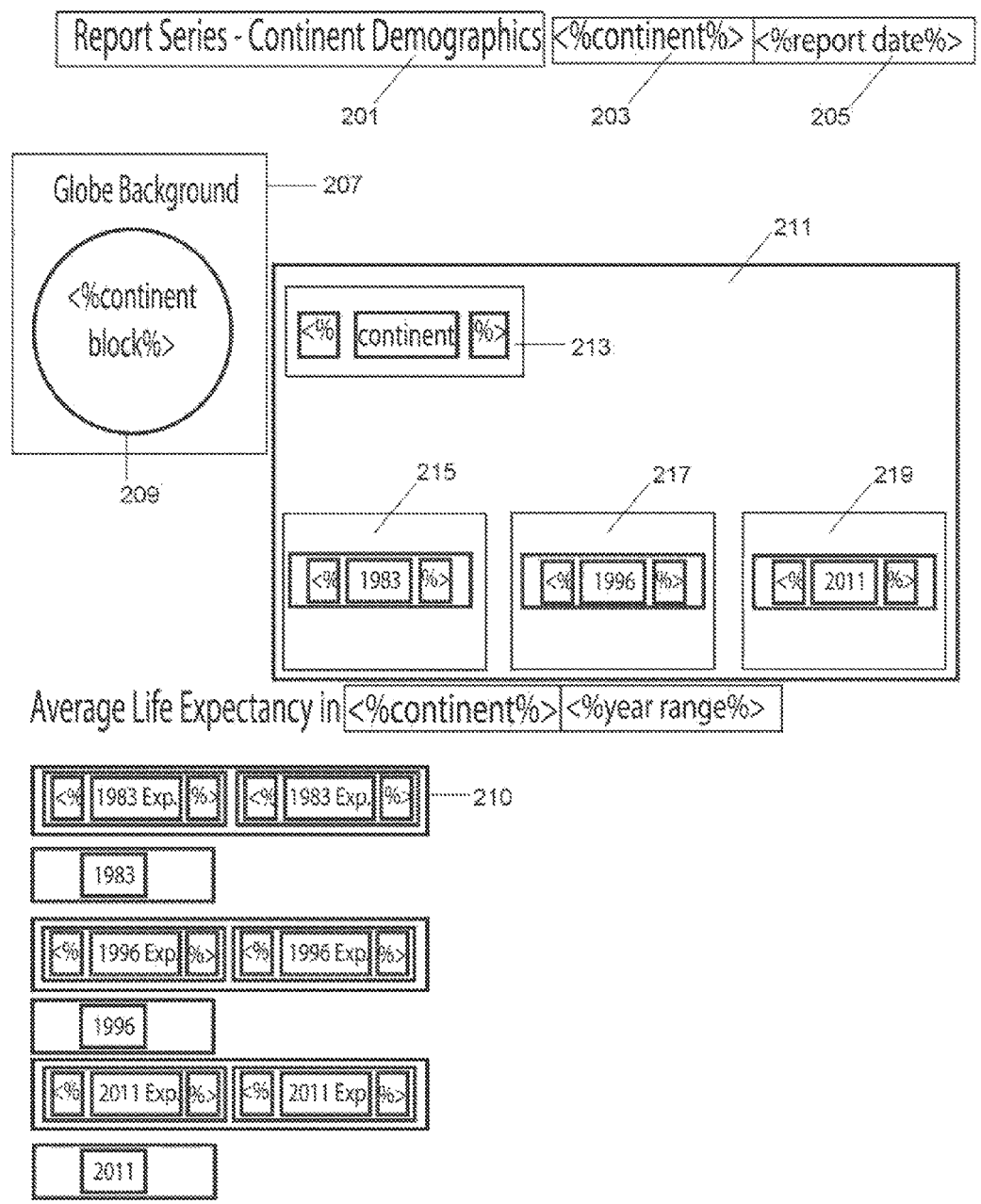
FIG. 2 is a graphical depiction of fixed and dynamic representational element identifiers of the image series, FIG. 1 representing one image in such a series, which identifiers might be assigned and used for recording and exerting fixed and dynamic elements in aspects of the present invention.
Figure 3:
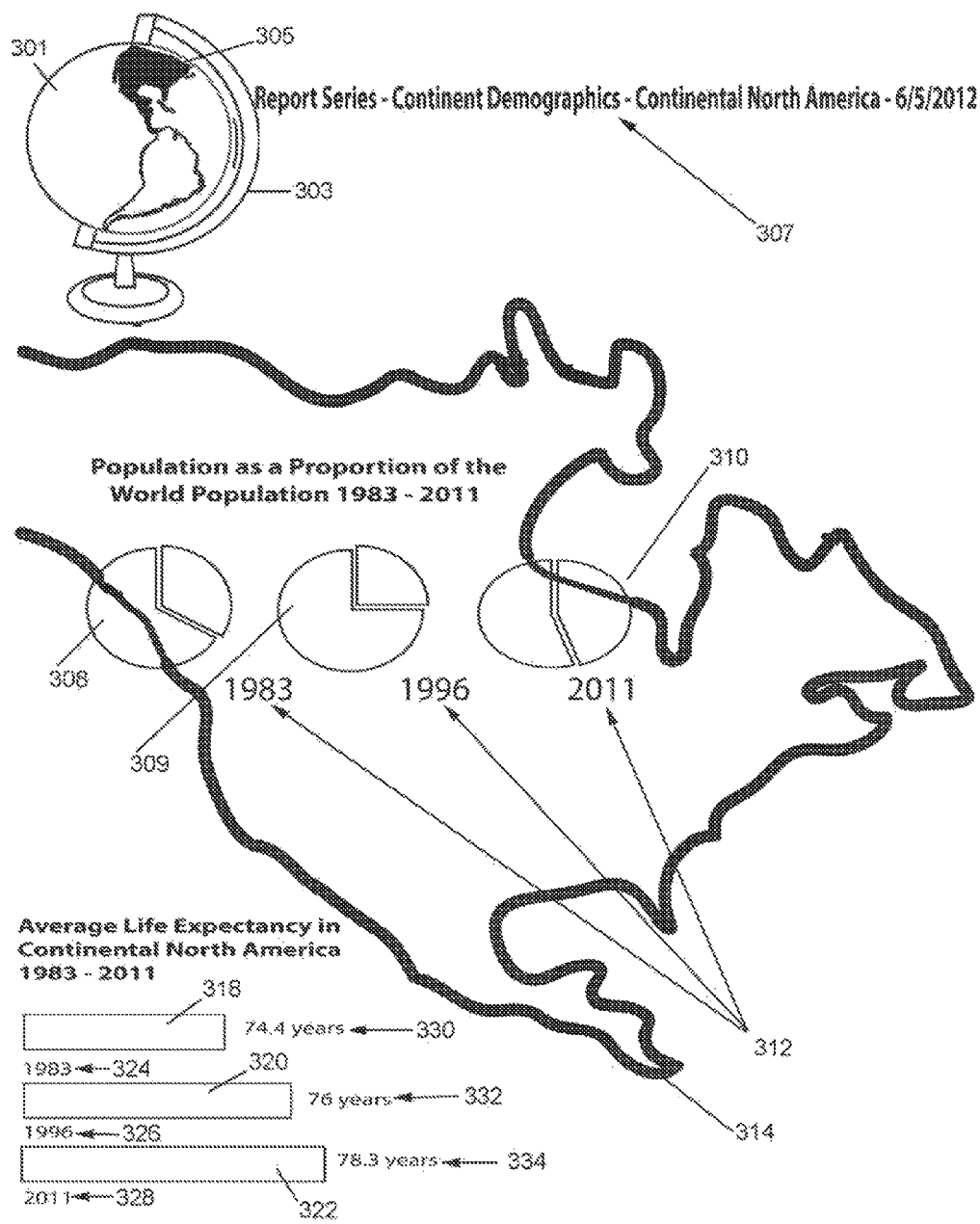
FIG. 3 depicts another example of representational elements of another image in the same image series as involved in FIGS. 1 and 2.

FIG. 2 is a graphical depiction of potential aspects of a user interface that might be used in an embodiment of the present invention, and that might be so used to generate the image series related to FIGS. 1 and 3. More specifically, FIG. 2 depicts fixed and dynamic representational element identifier tags of the image series, placed in an exemplary Cartesian coordinate space by a user, FIG. 1 having represented one such image in such a series. These element identifier tags might be assigned and used for recording, manipulating and exerting (or causing to be included in an image, set of images or image stream) Fixed Elements, Dynamic Elements and Semi-dynamic Elements, among other things, in accordance with aspects of the present invention. In certain aspects of the invention, a computer system includes computer hardware and is conditioned with specialized software creating a user interface that allows a user to create, layout, incorporate, assign or associate identifier tags at coordinates in a 2-D, 3-D or otherwise multidimensional representative Cartesian plane or space, or similar representative area or space, such areas and spaces being known in the art of creating general user interfaces. (Aspects of the preferred user interface to implement aspects of the present invention and an overview of a potential system are described in greater detail below, with respect to FIG. 11, among other places.) In accordance with aspects of the present invention, an identifier tag allows a user to indicate positions on a Cartesian plane or space on which Fixed Representational Elements, Dynamic Representational Elements and Semi-Dynamic Representational Elements will be associated, and also allows the user to create or associate other image elements, database elements, metadata components, Relational Aspects, Interactive Aspects or elements for Element Seeding or Borrowing, which may be previously unrelated to the system. A user may also generally or otherwise associate various elements, with no Cartesian coordinate association, which may otherwise alter or impact an image, set of images or image stream generated by the system. For example, the user may change the file format(s) in which a generated image, set of images or image stream is saved, some of which may have no background color filling in gaps (as is possible with .png format files) or may provide for automatic posting in viewable locations with filters and other workflow executed in a predetermined sequence on the files or in creating the elements of the files beforehand, through a workflow template (e.g., scan or gather designated source, build metadata, save as .png). In any event, the user may also use the user interface to cause the generation of an image or set of images or image stream after performing the creation and layout of identifier tags and otherwise incorporating, assigning or associating elements, setting Relational Aspects and Interactive Parameters and may also dictate other aspects of such image, set of images or image stream generation, as explained in greater detail with respect to FIG. 11, and elsewhere, below. According to aspects of the present invention, a set of such identifier tags, arranged in a Cartesian coordinate system with the user settings discussed above, which may be enriched by other associated tags, data, relational data and other aspects that may be set by the user (such as workflow templates), may be "saved" for later use, after which time it may be "reloaded," further altered and saved again, optionally, as a new version. These saved composites may be termed "templates," as used in present invention, and may include multiple pages or frames of such templates, which may be further organized into tiers and super-tiers, and also arranged or ordered for generation sequences, which may depend on user input (e.g., video game player commands through a gaming interface, viewing the output from the system). For example, a user might use aspects of the present invention to create, layout, incorporate, assign or associate the following identifier tags into a one-page template, which may be saved for later use:

Heading text identifier tag 201 is of a Fixed Representational Element nature (as may be selected, and later changed, deleted or modified by the user), describing text that may be placed by a user to create a descriptive heading for an image, set of images or image stream to be generated by certain aspects of the present invention. If the user were to generate an image, set of images or stream of images from a template with aspects described in FIG. 2, the result would include the placement of the same text in each generated image or point in the image stream, assuming that no further time or function condition or limitation to its display is applied (though such functions are possible, as explained below). The user may also set a number of other parameters, Relational Aspects and associated data, such as Seed or Borrowed Data to generate a visible texture, hyperlinks, font selection and library, background or foreground effects, source subject information and element interaction characteristics, including, but not limited to, a "z-index" parameter for indicating whether other elements would lie below or above the resulting generated Fixed Representational Element, based on its own z-index, if the two elements were to overlap by an arrangement later chosen by the user. Continent heading text identifier tag 203 is of a Dynamic Representational Element nature, describing text that may be placed as part of a descriptive heading for a particular resulting image, image within a set of images, or point in an image stream—specifically, the particular continent to which the image or point in an image stream pertains. If the user were to generate an image, set of images or stream of images from a template with aspects described in FIG. 2, the result would include the placement of text and other aspects dictated by the system that vary depending on the image, which variation may be dictated by an aspect of an associated database. For example, a database associated with the template correlating with FIG. 2 might be in the form of a .csv file, Excel file or MySQL database, with rows (the horizontal arrangement of cells structure) and columns (vertical arrangement of cells structure) of data, and each row might define aspects of each image generated by the system in a series or some amount of a stream of images (which amounts might overlap) while columns dictate which identifier tag is to receive, generate or be impacted by the data in the particular column. The database can be of any other type and configuration known in the art that might provide data on an image-by-image, or point in a function of an image stream, basis. Further aspects of such a database are described in FIG. 4, below. As with tag 201, the user may also set a number of other parameters (such as Interactive Parameters), Seed or Borrowed Data, Relational Aspects and associated data with respect to tag 203. As another example, and with particular application to tag 203, interactive parameters may be set such that a side or corner of the tag and its element output remains fixed at a point while, if the particular size of the generated representational element varies, the change in space occupation occurs at the location of the opposing sides and corner of the tag. Such a parameter could be directly determined by a user, or automatically determined according to other selections by the user—for example, if the user selects to "left justify" the resulting text, a lower left corner fixed point could be determined automatically. As another example, interactive parameters may be set to control the effects on and from other elements, such as other representational elements set by other identifier tags. On that score, turning to heading text identifier tag 205, which is also of a Dynamic Representational Element nature, it may be possible for the user to set parameters of tag 203 that affect tag 205 and its element output. For example, the user may set the two tags to collide, giving a "pinning preference" (or "pin preference") to tag 203 and tag 205 such that, if the two resulting elements were to overlap when generated from the tags, the element resulting from tag 205 would "bounce off" of (in other words, not overlap in occupied area and otherwise react according to a physical model) or deform in response to the element generated by tag 203. If both tags are given an equal pin preference, they might both share deformation and bounce effects in their resulting elements or, optionally, proportionally according to size, mass or other characteristics of the tags or resulting generated elements set by a physical model and/or physics engine (hereinafter, collectively, "physical model") of their behavior. As another example of interactive parameters, in other instances, if adjacent or otherwise associated tags provide for different clauses of a sentence, variations of phrasing (such as pluralizing or singularizing nouns and other grammatical or other logic) might automatically change aspects of one or each resulting element in reaction to the other. As another example, the tags might coordinate color schemes or vertical positioning, or select other reacting elements (for example, by system logic), to match the pattern between elements. As another example of an interactive parameter or aspect, any element that tag 205 generates may be caused to "stick" or move along or against the edge of the corresponding element generated by adjacent tag 203 in particular directions and orientations (including changes thereto over a time or another function) or they may apply force vectors in particular directions against one another, as determined by the system and user. In this way, any gap or incongruity that might otherwise result from the implementation of Dynamic Representational Elements can be cured, and other desirable dynamic effects may be implemented. The user may access any tag to both define and create new interactive parameters, or associate new image elements, database elements, Interactive Aspects, metadata components, Relational Aspects or elements for Element Seeding or Borrowing (replacing or in addition to those existing and already associated).

Globe background identifier tag 207 is of a Fixed Representational Element nature, and would cause the system to generate a background "globe with stand" image element if the system were commanded to generate an image, set of images or image stream, in accordance with aspects of the present invention. Such a background image might be accessed from a stored source ("library"), as selected in a user interface, according to aspects of the present invention and, for example, might be the background image depicted in FIG. 6. Turning our attention back to FIG. 2, globe foreground identifier tag 209 is of a Dynamic Representational Element nature, and, based on its positioning over globe background identifier tag 207 and, optionally, upon an alignment linking aspect, whereby the program determines a common coordinate system for tags 207 and 209 and ensures that they are aligned properly, and with a properly populated and assigned database, the user may dictate that tag 209 cause the correct continent feature of the resulting globe with stand image to be colored by a world continent overlay element which may be from an image library that may be assigned using tag 209 with the user interface. Thus, if the user were to generate an image, set of images or stream of images from a template with aspects described in FIG. 2, the result would include the placement of the overlay element associated with the appropriate continent to which the particular image pertains. This may be accomplished, in part, by a database with rows and columns, as discussed above, where one column of data contains linking information that is dynamically matched with the appropriate overlay element from an image library, as in, for example, FIG. 5. Thus, the user may use tags to indicate which column of data should be dynamically matched with an image library at a tag position, in addition to dictating whether to so match data with an image library, or print data from the database in a particular column, itself, at the tag location, or both. Optionally, the same effect may be accomplished by the user using the user interface to create one semi-dynamic representational element tag, with the abilities and features of both the background and overlay tag, 207 and 209. In either case, as will be explained in greater detail below, the user may also control the size, proportions, centering or justification, opacity, fill, blending mode, orientation and other characteristics of the dynamically matched image-based image elements, in addition to other aspects discussed above with respect to textual elements, as well as dictating the location and characteristics of text, if also printed, in relation to the matched image-based image element, and vice versa. For example, the user may dictate that the text element appear to "stick" or move along, against or near the edge of the corresponding image-based image element generated, in particular directions and orientations (including changes thereto over time or another function), regardless of the size of the actually matched image-based element in a particular image, image series or stream of images at a particular point along a function of that stream. The user may also dictate the distance at which the text and image-based representational element situate near one another, and on what side or at what point or degree of orientation they so situate. To match data with images, it is preferred that the data in the column chosen in the user interface for the tag in question contain at least a part of the actual name of the image-based representational element in the appropriate library, and that a default image library (or an image library selected by a function or variable function) be automatically selected that corresponds with the appropriate column of the database, but, alternatively, the user may dictate or change the image library, and may gain more control over template design that way by selecting more image libraries that may be of his or her own design.

Bar graphic identifier tag 210, in conjunction with some of its potential element output for different images in an image series or different points in an image stream as shown in other figures, illustrates an example where a tag is used to dictate the inclusion of both an image-based element and the data itself, and to further mandate that the data appear to stick or otherwise orient to the right-hand side of the image-based element, thus producing a compound element. Compound elements may be subject to additional control parameters that allow the system or user to dictate order, apparent mounting position between the two elements within an image, degree of margin between the two elements, and direction of alignment and arrangement between the two elements.

As with tag 207, continent background tag 211 dictates a background representational element but, in this instance, a dynamic one. Specifically, under aspects of the present invention, the system would cause a large background element—assuming that resizing element output to match tag size is selected as a parameter (which tag size may nonetheless constrain original image proportions, if so selected by the user) and assuming a supporting library that can be matched to database column data (or other source) is included or linked to the system at the selection of the user—to be created. In the instance of background element identifier tag 211, and as shown in its element output, examples of which are depicted as 114 and 314 (a part of FIG. 3, which will be discussed below), the user may have selected a warping Relational Aspect, which causes an impact on foreground representational elements potentially generated by tags 213, 215, 217 and 219, as will be explained in greater detail below and in relation to FIGS. 1 and 3. Identifier tags may place image elements at an original size in the Cartesian plane of the user interface, or the user may resize them, or otherwise change their appearance, with parameters of the identifier tags and the user interface in general, discussed in greater detail below, for example, in relation to FIG. 11, discussing aspects of a potential user interface.

FIG. 3 depicts a second example of representational elements of another image in the same image series (or another point in an image stream) potentially generated by aspects of the present invention as involved in FIGS. 1 and 2. By comparing differences and similarities between the resulting representational elements of FIG. 1 and FIG. 3, which are depictions of two different images in an image series, or two different points in an image stream, certain aspects of the present invention can be understood. As with image element 101, image element 301 is a representational element and represents and conveys to a viewer the impression of a globe depicting the Earth, with a representational element of a bracket stand 303, and coloration and texturization representational element 305 (specifically, depicting North America), comparable to elements 103 and 105 of FIG. 1, respectively. The image sources and potentially resulting representational element 303 is not substantially different from element 103. However, coloration or texturization representational element 305 affects a different location (the continent of North America) than representational element 105 from FIG. 1 (the continent of South America). In addition, warping and texture or coloration matching and overlay parameters set by a user interface and/or by the system have led the resulting elements of 105 and 305 to be oriented in space differently from one another—each correctly to match the borders of the outlined continents on which they belong in element 103 and 303, respectively, and with perspective and 3-D source data (a shere) dictating their final orientation and adjusted appearance for element output by the system. This dynamic difference, and others affecting image elements, can also result, according to the present invention, from differences in: associated data, for instance, in parts of a database or source and/or image library or other image source, other parameters, Relational Aspects, Element Seeding or Borrowing, the source seeded or borrowed, which may correspond with the image within a set of images or point in an image stream. For example, if a row of a database accessed by the system indicated in a column of data selected by the user for identifier tag 209 that the system should access a .png image named "North America.png" from an image library corresponding with that column, and if identifier tag were properly aligned, in a higher z-index and above identifier tag 207 (for the globe background) the system would place that image above a background image for the globe, thereby coloring, highlighting or texturizing the portion of the globe image that is the subject of this report (depending on the opacity of the image and other parameters for texturization effects, such as blending modes, selected by the user) for FIG. 3. According to the same process, the system would access a different row of data, associated with South America, in creating the image depicted in FIG. 1, and accessing another image from the same image library selected by identifier tag 209. Other techniques of originating, controlling, tweaking and resetting such dynamic effects are also within the scope of this invention. For instance, among the many parameters that a user might set, a user might indicate by using an interface that element 305 be partially transparent, rather than completely opaque, or that a variety of image blending aspects occur (such as overlay, darkening, lightening, multiplying, dividing and many other known, related blending modes) with the result of preserving or blending aspects of the underlying fixed globe image to some degree where there is overlap. It is also within the scope of the invention that streaming data or Element Seeding or Borrowing, including fixed and dynamic textures and colorations, be used to create such dynamic effects, rather than a database, while still yielding such a dynamic change from point to point along an image stream function. It is also within the scope of the invention that a single semi-dynamic identifier tag be used, rather than multiple identifiers tags, thereby conflating the features of both identifier tags 207 and 209, and thereby potentially easing the proper placement and interrelationship between the two resulting elements.

Similarly, different associated source data, parameters, Relational Aspects, Element Seeding or Borrowing, seed or borrowed source (each of which may correspond with the image within a set of images, or point in an image stream) may lead to differences between header representational element 107, in FIG. 1, and 307, in FIG. 3. Heading identifier tag 201, as potentially created and placed by a user as a fixed element, creates the same textual element part (namely, the first four words of the heading) in both element 107 and 307. However, the dynamic element identifier tags 203 and 205 yield different results in the image created that is depicted in FIG. 3 when compared to its counterpart in FIG. 1, owing to different associated dynamic data or Element Seeding or Borrowing. Certain interactive parameters, which may be variably set by the user, explain the seamless presentation of both dynamic elements set by identifier tags 203 and 205, even though the resulting representational element components are of a different length than those of FIG. 1, namely "Continental North America" and "Jun. 5, 2012," for FIG. 3, versus "South America" and "Aug. 5, 2012," for FIG. 1. Namely, the user may have set a collision interactive parameter between tags 201, 203 and 205, with a left-side pin and pinning preference to tag 201, 203 and 205, in that order of priority, in conjunction with a "shrink-to-fit" parameter (although other parameters, such as a wrap-to-next-line parameter, may also be set, based on the workspace, leading to overflowing text flowing to the following line space of the report) leading to the line of text shrinking or reducing in font or other size-bearing characteristics in FIG. 3, in comparison to FIG. 1. Any similar parameter may be automatically set as a function of using a text-creating tool in creating the identifier tags. Likewise, different associated source data, parameters, Relational Aspects, and Element Seeding or Borrowing may explain differences between the set of pie chart representational elements in FIG. 1 and FIG. 3, namely, representational elements 108-110 and elements 308-310, respectively. For example, different source data associated with the image depicted in FIG. 3 could be matched by the system to different identified images from a pie chart image library, and then incorporated in the image, such as data of "70%" being matched by the system with a 70.png image from the library associated by the user in identifier tag 215, using a user interface (by an indexing and title matching function of an automatic query and producing resulting found image based on data in cell search engine, for example). Interactive parameters could also explain the resulting seamless and effortless resulting interaction between element 308, and the background element 314, which element 308 now overlaps the background element 314 of a lower z-index, but allowing some data from the lower image to pass through, in FIG. 3—potentially, as a translucent effect, or overlay parameter. The usefulness of a compound element tag is shown in representational elements 318, 320, 322 and 330, 332 and 334. For example, by setting both a dynamically matched image element and a text element in one element, such as with identifier tag 210, and then setting a parameter for the text element to mount directly, at 90 degrees, to the right-hand side of the image element, with text not warped or rotated, with a few millimeter margin, the resulting numerical data is always clearly presented alongside the resulting bar of the bar chart, which may vary greatly from image-to-image in a series, or from point-to-point in an image stream, generated by the system. It is within the scope of this invention that many elements (far more than 2), of multiple types, may be associated in such a compound tag, with separately-set parameters, such as mounting parameters and physical model parameters for originating 3-D or 2-D objects (or "subjects" of the image elements), which models may include other aspects and elements, many of which may not be representational.

FIG. 4 depicts an example database that might be used by a system according to aspects of the present invention to create the images or points in an image stream depicted in FIGS. 1 and 3, from aspects of a user interface depicted in FIG. 2 (and FIG. 11, which will be discussed separately, below). The database depicted in FIG. 4 contains a column and row structure that is commonly used in certain database systems, such as Microsoft's "Excel" software, Oracle's Open Office "Calc" program and MySQL, to name just a few with this type of structure. The leading or top row 401 may be used by the user and system as a "title" row, meaning that the data contained in its cells, 403-415, serves to provide titles that aid the user and system in recognizing data in the rows below each of them. For example, the title in cell 405, "Report Date", aids the user and system in recognizing that an identifier tag containing the same characters, "Report Date," (potentially with coding tags to key that a database call and response is required, such as the leading and trailing % symbols shown) requires that data from the column below that heading be placed at the coordinates or according to the other parameters of such an identifier tag into a resulting image, set of images or image stream. The rows of information other than the title row, which are depicted as numbers 417, 437, 455 and 457, each contain the data for each heading and column that corresponds with one image or point or range in an image stream to be output, rendered and/or generated by the system. In the instance of an image stream with ranges, cells might set out time signatures or other indicators of duration or type of presence for an element, or such parameters might be set out separately from another data or streaming source. Such database sources might be modular and freely arranged and associated in the sense that they need not function row-by-row in order, but may instead have points of data or streaming sources that overlap in time encoding or signatures and other functions and may have multiple interactive properties or logical controls, interrelating with, and depending on, other source data and other conditions external to the database and/or sensed or input by the user or system, causing some data to be processed in an order other than top-to-bottom to generate images, and in sequences that differ column-to-column. Nonetheless, in the present example of a preferred embodiment of aspects of the present invention, one row generates data for each image of an image set or point or range in an image stream. It is preferred that other parameters controlling aspects such as positioning, interactive features and logic underlying the display and imaging features be controlled in a separate database or storage medium that may not be visible to all users, thereby making the user interface more user-friendly, and making the column and row database have one clear function to a user accessing it—namely to dictate the content, order and/or general duration of dynamic representational elements in an image, image set or image stream. It is within the scope of the invention that the data and identifier tags be represented differently, in a user interface with an image-by-image preview function and other controls for more easily changing the data. For instance, a user might simply click on, click and hold and move the cursor to resize or dial back a bar graph or pie chart component, or other such element, in the preview and adjusting positioning, orientation and sizes of such previewed elements, which leads the system to cause a change in the underlying data in the database for the corresponding row of data to match the new image element selected.

Figure 5:
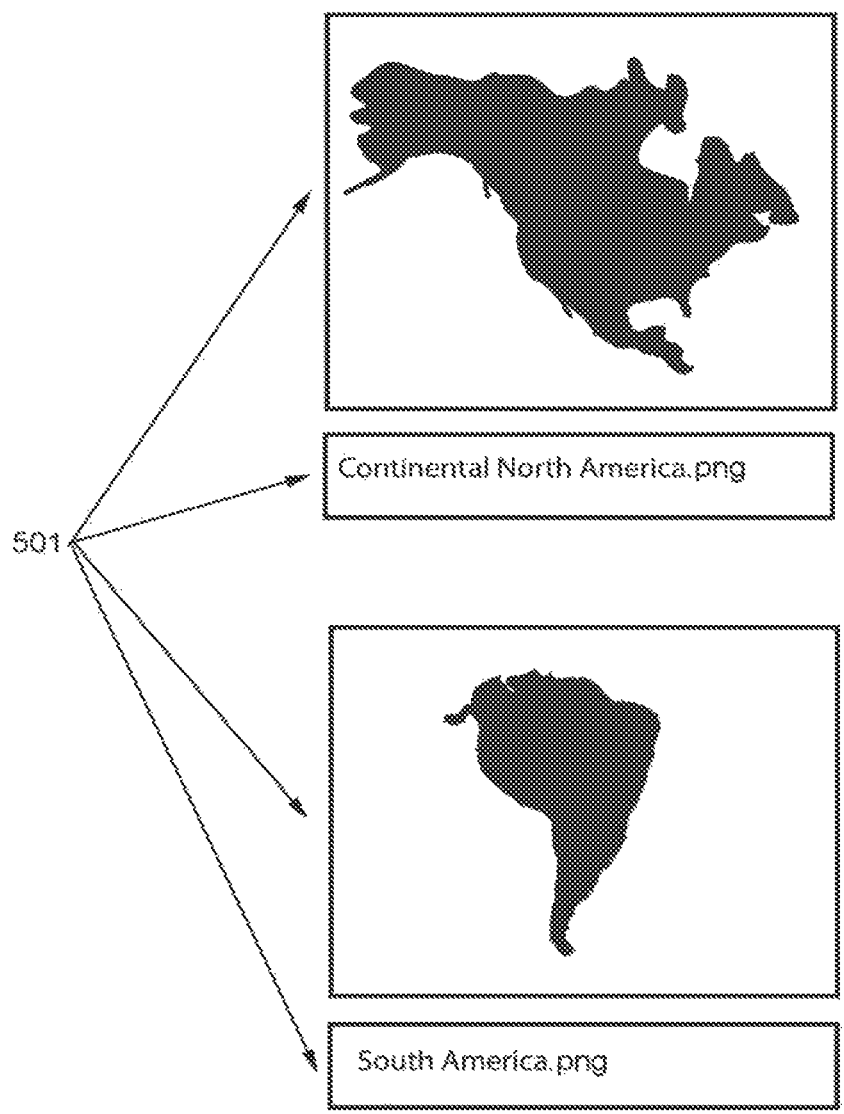
FIG. 5 depicts an example image series for a coloration and/or texturization representational source image that may be overlaid onto a globe background representational image element in accordance with aspects of the present invention, as shown in FIGS. 1 and 3.

FIG. 5 depicts an example image series for a coloration and texturization representational element that may be overlaid onto a background globe image element, as shown in FIGS. 1 and 3, according to aspects of the present invention. As explained with respect to FIGS. 1, 2 and 3, a user interface may allow the creation of a single identifier tag, and may create a single semi-dynamic element with both a background image and the coloration element as components incorporated. However, it is also possible to have separate identifier tags, that nonetheless become linked or otherwise associated with Interactive Aspects by parameters set by the user, yielding substantially the same result, or having two images placed in conjunction—one for the fixed background of the globe and stand (a Fixed Element) and one of the appropriate overlay element for the particular image (a Dynamic Element, changing with each image, image in a series of images, or point or range in an image stream). As explained with respect to FIG. 4, a data source may access and link the appropriate image library 501 for the continent overlay element, (as such a library may be variably created and selected by a user in conjunction with an identifier tag, such as identifier tag 209) and a system according to aspects of the present invention will access the image from the library that matches identifying information from a data-source that is identified with the identifier tag, placing the correct continent overlay element relating to the image to be created, onto the fixed background image and, optionally, applying other Relational Aspects and parameters (such as orienting and warping to "best match" underlying image boundary patterns) and merging and flattening them into one image representational element. It is within the scope of this invention that image libraries themselves be dynamic, incorporating additional data and sources, or that an external database (such as one on the internet) be accessed and searched and that matching be evaluated based on any search criteria variably set by the system or user, not just image titles matching data in a data source.

Figure 6:
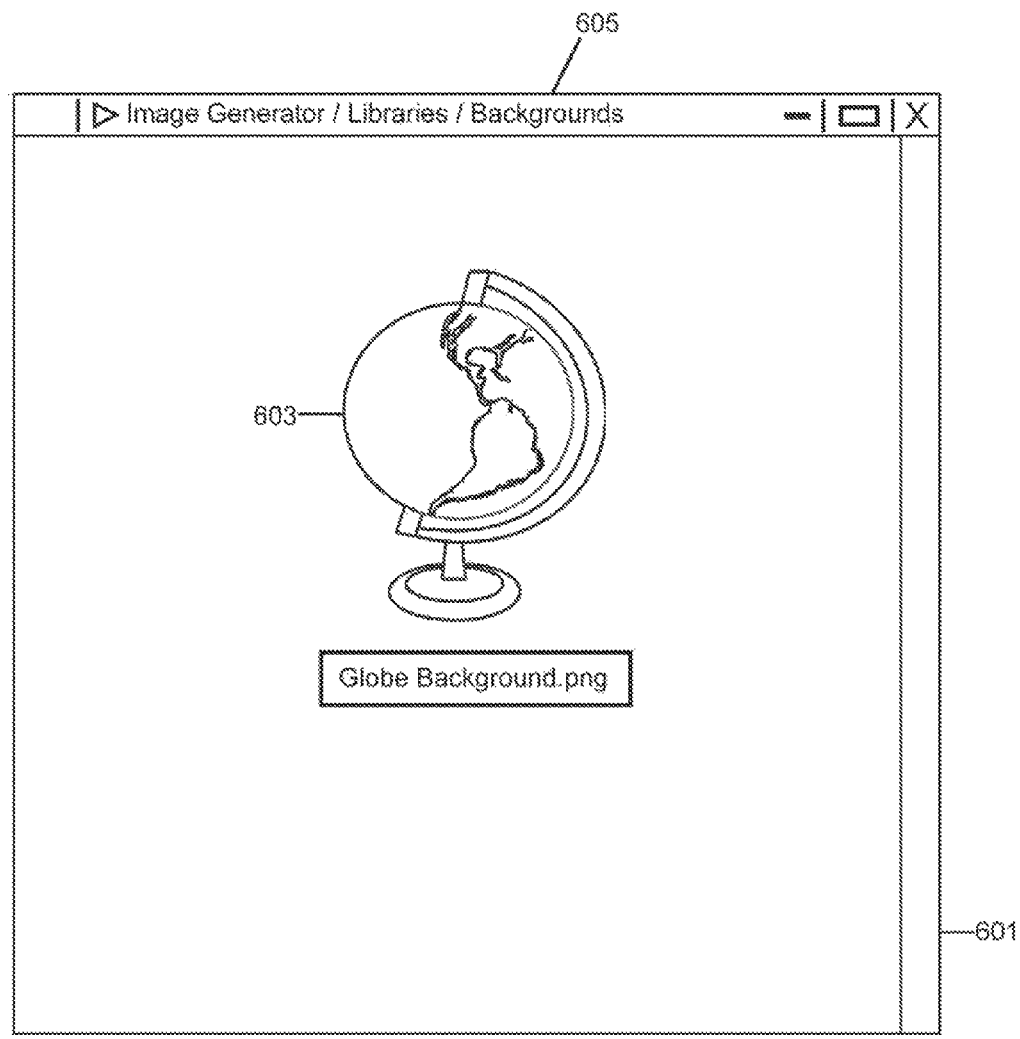
FIG. 6 depicts an example background representational image element source, for the "globe with a stand" Fixed Representational Element shown in FIGS. 1 and 3.

FIG. 6 depicts an example background image, 603, for the "globe with a stand" Fixed Representational Element shown in FIGS. 1 and 3, as it may appear in an operating system explorer view, with its title (in this instance, "GlobeBackground.png") below its display. It is this image element that may be located in an image library, as shown in display window 601, just as with the dynamic image library of FIG. 5, to form the background for those overlay elements depicted in FIG. 5. (Incidentally, the same type of window view may be used to experience the library discussed in FIG. 5.) With the exception of properties, parameters and aspects relating to dynamic data matching from a data-source, all of the same abilities of the identifier tags and user interface discussed above with respect to FIGS. 1-5 may apply to the identifier tag (207) yielding the fixed background element that approximates or is the appearance of image 603 within resulting generated images. Identifier tag 207 allows a user to select a background image library, 605, and further select a particular image, such as 603, that will be implanted as a representational element of every image, set of images or stream of images set forth in an image generation run, which may be initiated, maintained and directed to destination location(s) by the user, for example, by internet or intranet sharing, e-mail, instant messaging, conventional printing, display, performance and broadcasting, or any other known means of delivery for images. The fact that the identifier tag is fixed, and that the background image itself may be of a fixed form (although it may also be non-fixed, as with .gifs and updating images from another source) does not mean that the representational element as is incorporated into an image must be completely fixed in nature. As explained previously, for example, Relational Aspects, parameters and Element Seeding or Borrowing may greatly change the appearance of such a fixed representational element, and may do so according to a function or stream, which may vary from image to image, for example.

Figure 7:
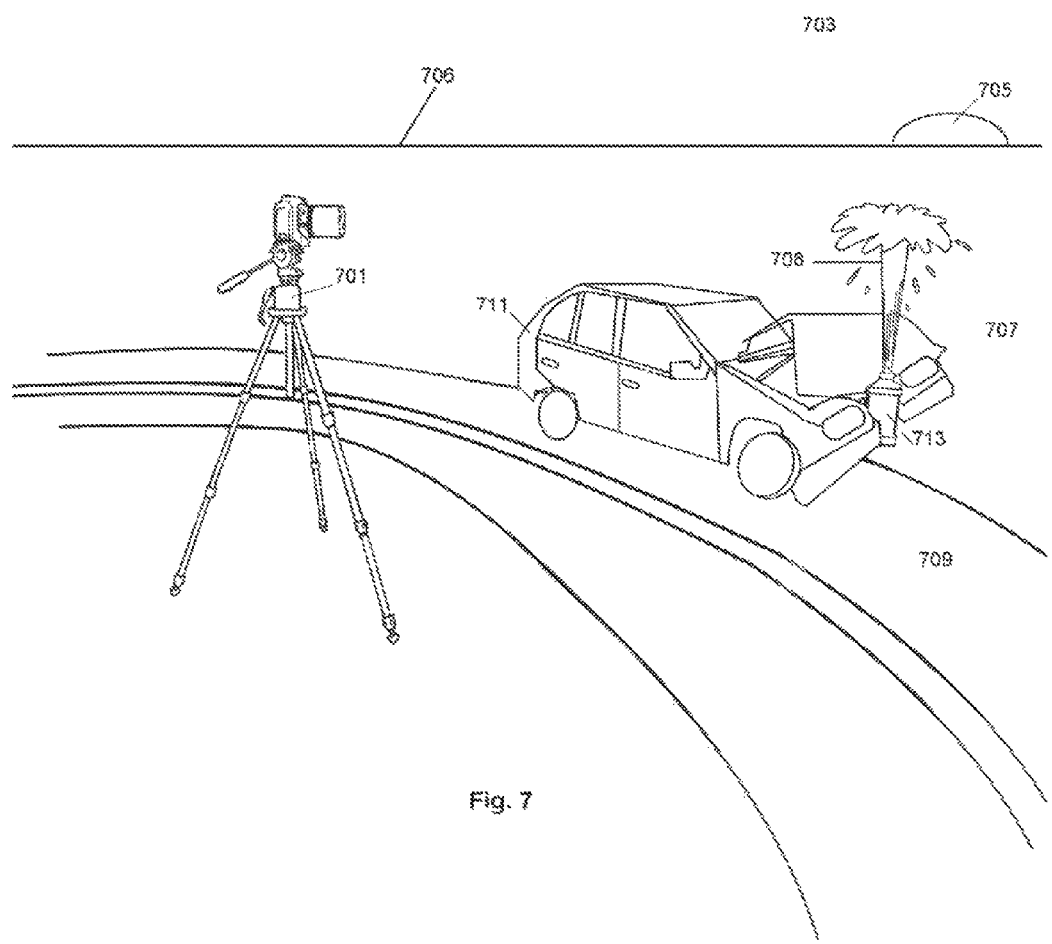
FIG. 7 is a perspective drawing of an exemplary image capture activity, as might occur in using aspects of the present invention, involving a movie camera capturing a scene with a car colliding into a fire hydrant during a sunset.

FIG. 7 is a perspective drawing of an exemplary image capture activity, as might occur in implementing apsects of the present invention, involving a movie camera capturing a scene with a car colliding into a fire hydrant during a sunset. Generally speaking, image capture (as a single image, set of images, image stream, or image elements and characteristics) aspects of the present invention can be thought of as separate or overlapping or complimentary to the image creation and generation aspects discussed above, and may be used in conjunction with them for a seamless image capture, processing and distribution work-flow that can be extremely efficient and yield greater realism and verisimilitude, and with a greater, more intense and more helpful or enjoyable impact on a user experiencing the results of the invention. The image capture aspects of the present invention include the ability to interpret, record and re-represent sensed images as similar or enhanced composites of fixed, dynamic and semi-dynamic representational elements, or as data and tags that would, under the operation of the system, generate such similar or enhanced composites of fixed, dynamic and semi-dynamic representational elements. Camera with tripod 701 is set up to capture a scene taking place before it. 701 may include any sensory and sensory transmission or conveying apparatus, such as a still camera, a moving picture camera, microphone or a hybrid sensory device, such as, but by not limited to, a digital single lens reflex camera ("SLR") with both separate picture and movie capturing capabilities, and a built-in microphone, such as the Canon EOS 5D Mark II. 701 may also be a more advanced, direct conveyance or all analog or optical format transmission medium, not requiring a digital sensor or storage medium, but still allowing the transfer of streaming media, such as by fiber optic cables. Many other methods of capturing images are known in the art, and within the scope of this invention. In this example, camera with tripod 701 is sensing and storing or transmitting a scene, or transmission medium encoding the same, including a sky 703, sun 705, horizon 706 (into which the sun 705, if a real or accurately representative theatrical set piece sun, may be setting), a relatively flat ground landscape 707, and a moving vehicle 711 driving partially on and partially off of a roadway 709 that collides with a fire hydrant 713, which becomes partially knocked over and ruptured, causing a torrent of water 708 to rush skyward like a geyser.

Figure 8:
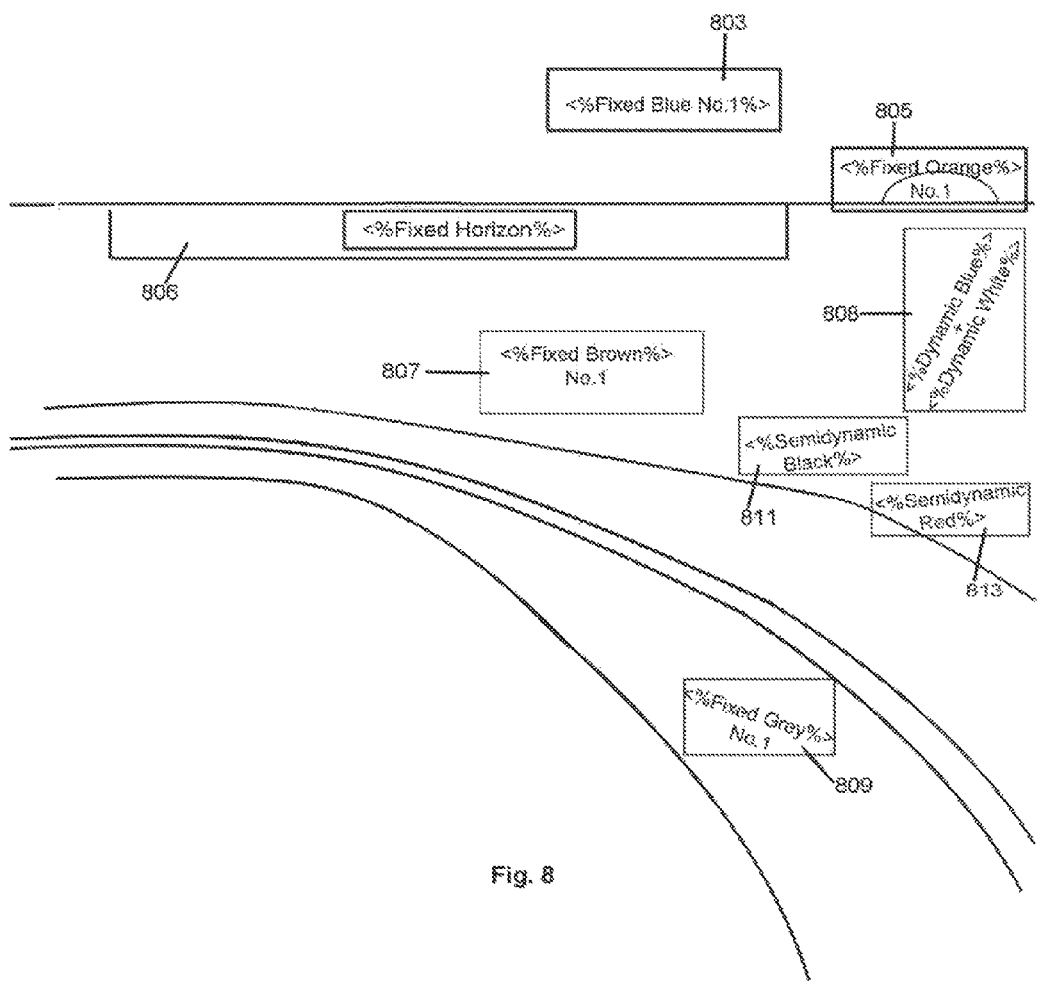
FIG. 8 is a graphical depiction of Fixed Elements, Dynamic Elements and Semi-Dynamic Elements, as might be defined by aspects of the present invention upon digesting the capture activity depicted in FIG. 6.

In FIG. 8, one can see a depiction of how this same scene might be captured, tagged and summoned forth for image creation and distribution by a system in accordance with aspects of the present invention. For convenience, the same basic perspective is given as that provided in FIG. 7, although it is understood that the camera would have to be moved to gain the perspective of the figure. The system first may sense and recognize, based on image capture activity, which may include a comparison of different frames and/or data from more closely related time periods, that at least a majority of the sky region 703 is relatively unchanged from moment-to-moment, and create an identifier tag 803. Although the coloration, size, movement (shifting) and shading of 703 may change subtly from moment to moment, due to the setting of the sun 705 as a light source and other atmospheric factors, the system may employ Variation Toleration (which may be adjustable by the system or user by an amount of toleration control, and so adjustable on an item-by-item or functional basis) to avoid identifying the region for dynamic representational element treatment, and thereby avoiding saving or transmitting specific data covering each slightly changed aspect that is below threshold of the Variation Toleration, such as a slight pixel change, as an image file, part of an image file, series of image files or image stream. In addition, the system may sense boundary lines, similarity in multiple images of an element that has moved, in terms of size, shading, lightness, color or texture, or 3-D subject matching, in captured images to describe or supplement image boundaries between elements. In generation, or after distribution, however, realism, including the vibrance of very slight but realistic changes in such "Fixed Representational Elements" (or even other, Dynamic Elements) may be added in by a function approximating similar observed slight changes, which may include Element Seeding or Borrowing from other sources, such as from a library of luminance, coloration and scintillation effects, functions, integrals, derivatives or other formulas for similar slight changes. Upon recognizing and capturing regions as relatively fixed representational element tags, a multivariate search tag encoding can be recognized, assigned and/or recorded to ease such a search and matching. For example, a code such as "BHSNMCLRMLFG" might be recognized or encoded by the system, where the recognition aspects or encoding stands for "Blue Hour Sunset New Mexico Clear (sky) Medium Light Foreground" and is so understood by the search system aspect, which uses appropriate search indexing and library structuring to facilitate later retrieval of such dynamic elements, elements, aspects, Element Seeding or Borrowing and effects to alter or condition the fixed element potentially resulting from identifier tag 803. The same potential aspects may be applied to identifier tag 805, which is created in reaction to perceiving, channeling or conveying the setting sun, 705. While some aspects of the sun will change slightly, the system may be programmed to tolerate such changes, while recording or associating useful information for reconstructing very similar or even more richly enhanced, striking, useful or compelling changes when generating an image, set of images, or image stream from the image capture activity. In addition, we see a new type of identifier tag feature, whereby an outline preview of the potentially resulting element can be seen, as the outline of the boundaries of the sun within or about the identifier tag 805. Similar aspects of the invention may apply to the relatively unchanging background elements 707 and 709, and the identifier tags assigned by the system in a Cartesian plane or virtual space user space, namely, tags 807 and 809. It should be noted that, with respect to camera shift, yaw, pitch, descent, ascent or vibration, that the Element Seeding or Borrowing can be from a relatively few still shots of the scene, that are encoded for a shifting algorithm or function by the system, and only the new or dynamic aspects of the shifted scene need be newly recorded from image to image or point to point in the image stream. Furthermore, because more dynamic subjects, tags and elements tend to be centered or controlled in predictable points as subjects of an image, series or images or image stream, such as at the points according to the "rule of thirds," the system may easily reposition such dynamic elements and their identifier tags in such locations, and filling in regions at the periphery of the frame from data from Fixed Element sources or other sampling taken before moving of the camera, thereby reducing or eliminating "camera shake," hand tremor and other aspects of the composition of a series of images or of an image stream that reduce fluid, steady viewing.

Turning next to the tag created to identify certain aspects relating to the moving car, 811, a system according to the present invention may sense boundary lines or movement, including the movement of shadows and reflections, especially when comparing neighboring and other images in an image series, or different points in an image stream, to define a region in the user space (such as 2-D Cartesian, or 3-D virtual space) and image(s) or image stream to be produced, identified with the moving car and to store image, image change, movement functions and other equations, Relational Aspects and other data defining a representational element for the car, including, with logic to fill in gaps and, as necessary, from information from multiple views of the car, to define it as a 3-D subject giving rise to the car representational element. 3-D physical model characteristics (such as a mesh or filled, textured and rendered 3-D object) can be captured and incorporated by observing the source object subject movement and deformation. All of this information may be associated and accessible for manipulation in identifier tag 811, created by the system.

The system is not restricted to assigning one identifier tag per element with perceptible 2-D or 3-D boundaries or other characteristics. Multiple areas, with few shared boundaries or characteristics, or with discrete boundaries from one another, may share one identifier tag or different instances of the same identifier tag. The system may perform an efficiency analysis, estimating all tags that may be used based on potential fixed dynamic elements and fixed elements, and estimating the processing cost while maximizing representational enhancement and verisimilitude, and factoring one or more of the outcome of such analyses into the decision whether and how many representational and other identifier tags to create and other data and aspects to associate or bring to bear on an output. The outcome of such analyses can be re-run periodically during an image capture activity, or can be performed after image capture and recording in conventional media. The outcome can be changed, or the setting for the outcome can be altered, based upon user settings, which may grant a preference for more or less elements or more or less enhancement generally, and for certain aspects of the image captured. For example, the user may seek to boost local contrast, as in high dynamic range ("HDR") imaging, by boosting the amount of the system's fixed representational element generation with different exposure characteristics and use Seed Data producing a higher contrast. The same can be done to increase or decrease any image aspects or effects, to introduce new elements not originally in the image capture, recording and distribution, to create filters, and to provide new interrelationships between representational elements and parameters.

To illustrate, as the motion capture activity continues in FIG. 7, and representational and other elements, as in FIG. 8, continue to be created as decided by the user or in the system's analysis, the car 711 collides with a hydrant 713. While the car and its shadow may have initially been defined by a fixed element identifier tag (or tags, for example, one for the shadow having a less opaque aspect and higher z-index than the road element 809, while another being more opaque to define the body of the car, other more metallic elements with sheen being tagged to have a reflective aspect, as one example), a new layout (using dynamic templates, or a series of templates, or tags that are themselves changing both in number and kind (hereinafter "morphing tags") may be created to capture the scene for distribution, manipulation, recreation and further redistribution. The initial identifier tag 811 may shift on the 2-D plane of the user interface, and associated data and relational aspects concerning its shifting perspective or deformation may begin to be incorporated on the template line or function with respect to that identifier tag. Alternatively, or in conjunction, new tags for depicting the distortion and deformation of the car as it impacts with the hydrant may be added, with Relational Aspects concerning the remainder of identifier tags describing other representational elements—for example, a collision relational aspect with an identifier tag representing and constructing a representational element based on the hydrant 713. As discussed previously, physical and descriptive models, functions, integrals, derivatives and other equations may be associated in identifier tags, such as those created for the car and hydrant. For example, an anchoring function for the hydrant, as it is connected to a pipe below, and as both are 3-D subjects creating 2-D or 3-D imaging and representational elements, and a rupture point, after which water begins to rush out, requiring the creation of dynamic water element(s), such as the blue and white dynamic representational element 808, may be created. Component seeding and borrowing may be used to rebuild a "water rushing" texture onto the flowing water for example, by borrowing and applying seed analog data from fiber optic cables conveying water rushing at a geyser, as will be explained in greater detail with respect to FIG. 10. Such a texture may be blended onto a more basic image for the rushing water contours, with enhanced contrast, creating a hyper-realistic effect.

Any tag created by the system may have physical model characteristics for a computer-generated ("CG") subject created by the system and, as such, any number of CG or CG-associated elements may be generated in their place by the system, automatically, or at the option of the user. With multiple views and/or logic, 3-D and physical characteristics may be assigned as a subject of an element (and its identifier tag in the system). For example, the car element might be deduced to be roughly a rectangular box in its base shape and moving, and occupying a particular space with measurements. By associating a different element (for example, an image or CG object representing a locomotive train) in the same orientation as the original captured or channelled element, a different element can thereby be interposed. As more views of a recognized element are taken in the capture activity, a more thorough image element or 3-D model of its subject may be gradually built, leading to greater flexibility, requiring less system logic, to create resulting images with similar characteristics. But system logic may be particularly helpful where a full capture of a particular element or background, in the instance of interposing images onto a background, is not possible. In this way, distinct advantages over existing "green screen" technology (even setting aside the more limited scope of application) can be seen.

Figure 9:
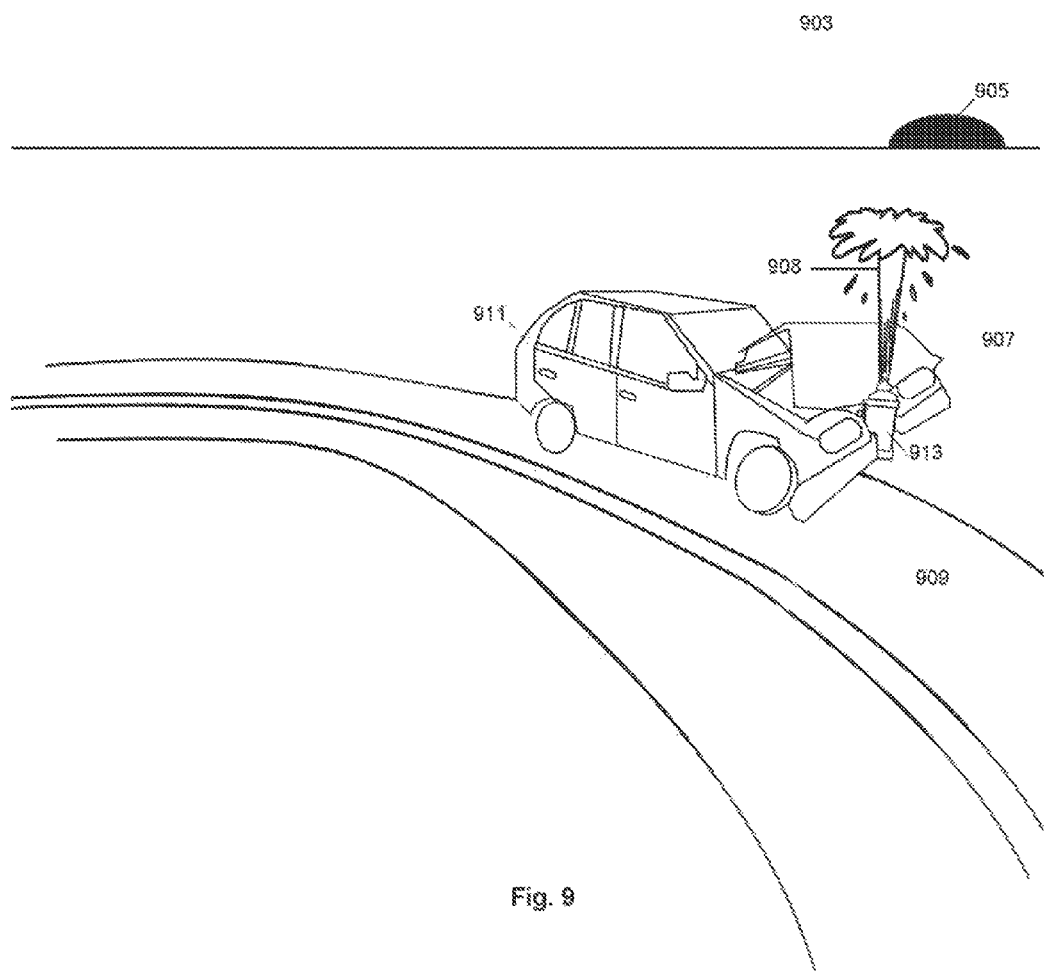
FIG. 9 is a graphical depiction of an example resulting image as might be rendered in accordance with aspects of the present invention, from the capture activity depicted in FIG. 7.

FIG. 9 is a graphical depiction of an example resulting image or point in an image stream as might be rendered by the present invention, from the capture activity depicted in FIG. 7. In addition to creating some aspects of the captured scene depicted in FIG. 7, it should be noted that additional aspects (such as sourced data, textures, vibrancy, or other image aspects) have been incorporated or allowed to impact some image elements. For example, the sun 705, now has a color or texture change, which may be from Element Seeding or Borrowing, for example, from centralized analog data of a star surface that is stormier or more dramatic than the actual scene from the sun. Alternatively, a function may be applied by the system for varying aspects such as textures or other associated data in digital or analog format, or for controlling such data from ambient or seed and borrowing sources (e.g., setting luminosity, brightness or other limits, e.g., for peaks in variation) alone or in combination with information from the seed source (e.g., observed variation information is plotted into a function or other approximation, or function or approximation varying the function or approximation). The resulting blended, overlaid or otherwise affected representational element, 905, is depicted in FIG. 9 as darkened solid black to represent that aspect in the image or point of an image stream. Similarly, representational element 908 may be a composite or hybrid of image data captured from the scene in FIG. 7, and the result of application of moving texture data that is conditioned and applied from an external source, such as a geological geyser, depicted in FIG. 10, discussed below. This difference in the final image or point in an image stream rendered is depicted by a darker line around the rushing water representational element 908 in FIG. 9.

Figure 10:
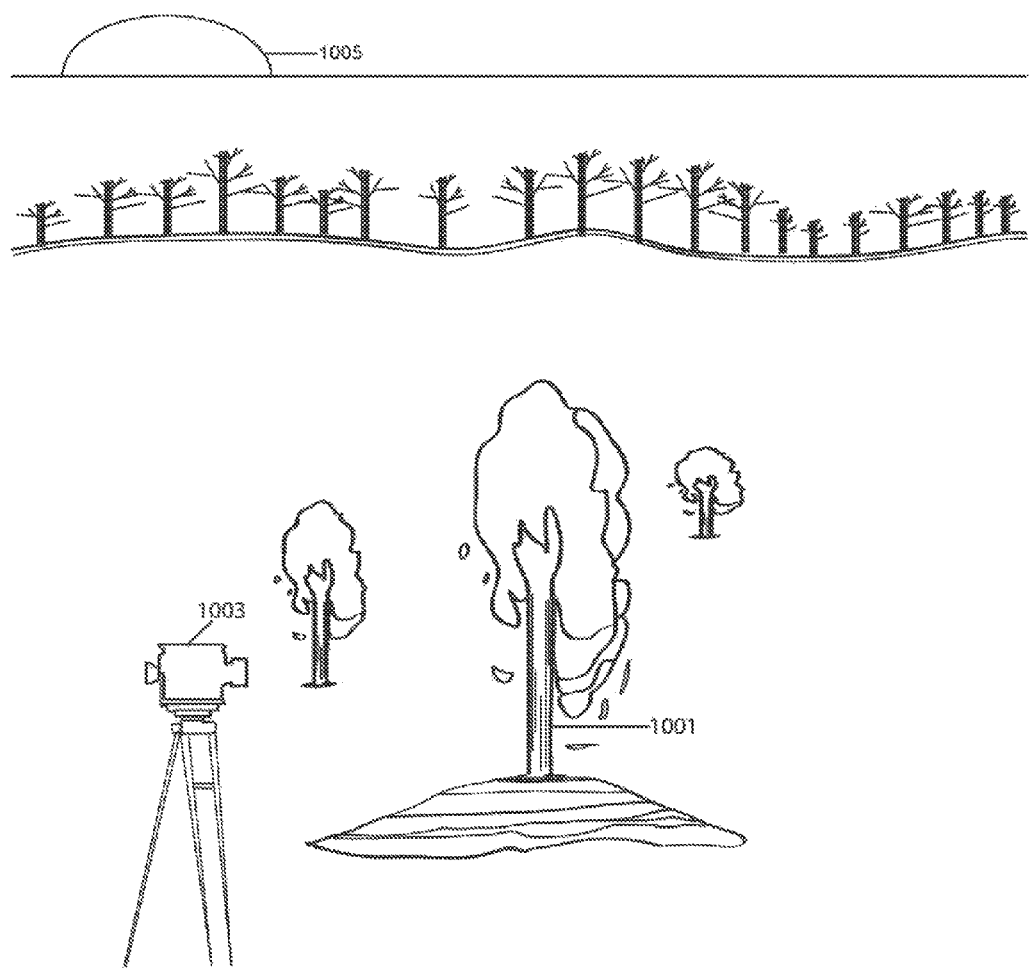
FIG. 10 depicts an exemplary element seeding or borrowing source, and capture activity involving the same, as might be used in accordance with aspects of the present invention—specifically, a seed dynamic texture source, as might be used in the image capture and generation depicted in FIGS. 7-9.

FIG. 10 depicts an exemplary element seeding or borrowing source, and capture activity involving the same, as might be used in accordance with aspects of the present invention and—specifically, a seed dynamic texture source geyser 1001, as might be used in the image capture and generation series depicted in FIGS. 6-8. In the example provided, a rushing water texture source is sampled or taken from a geyser 1001 in a geologically active park (for example, Old Faithful at Yellowstone National Park in the United States). A live streaming image of the park, which may be analog or directly transferred light, is taken by a camera or other image or sensory data transfer device, 1003, (which may include filtered or other selected data gathering) and made available for enhancing representational elements as digital or analog composites or hybrids by aspects of a system in accordance with aspects of the present invention. Element Seeding and Borrowing may be controlled with centralized filing systems or libraries, with dedicated hardware and search indexing for higher-speed identification, matching and transmission to any validated request (for example, with proper authenticated licensing) (not pictured) which allocate streaming, analog and direct image data, as needed for such Element Seeding and Borrowing. The system may stream or directly transfer such element seeds or borrowed items to enrich the images for which Element Seeding or Borrowing is requested, and may validate the seeding and borrowing.

Prior to applying the sampled or transferred element seed, that seed element may be conditioned and altered to create more realistic effects, more limited or altered aspects, or more appropriately blend them with other representational elements. For example, the light source, 1005, is shifted to the left in the streaming or other data from the geyser depicted in Element Seeding or Borrowing 1001. As such, the system or separate seed library manager may first create a 3-D object from multiple views of the object, and then shift perspective or light sources virtually to match the light source perceived in the scene from FIG. 7, or may simply partially flip horizontal axes of copies of the seed data (or in the scene) and blend images to create an overall impression of an identical angle in the light source.

Figure 11:
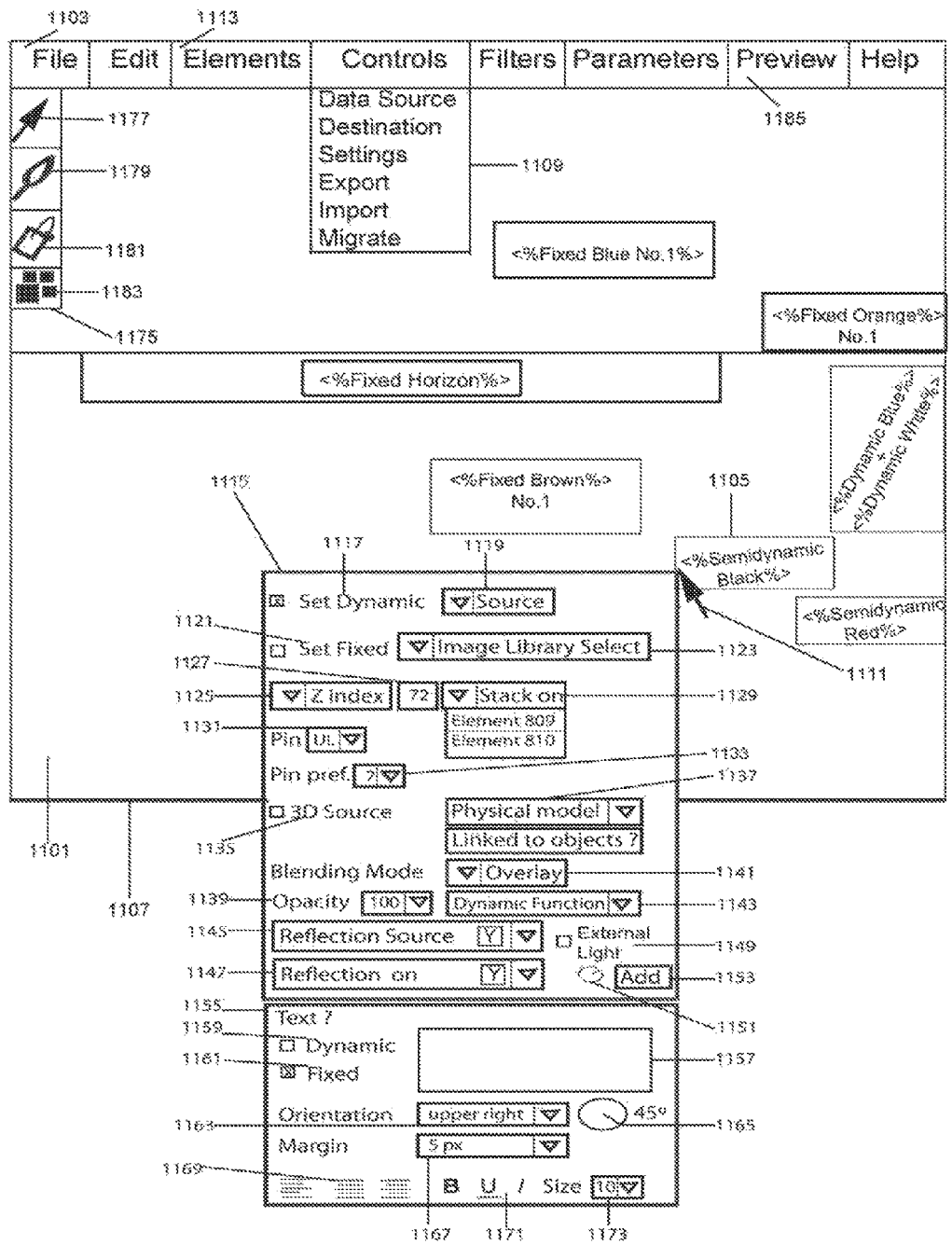
FIG. 11 is a depiction of part of a user interface that might be used by a user implementing certain aspects of the present invention.

FIG. 11 is a depiction of part of a graphical user interface that might be used by a user implementing certain aspects of the present invention. As shown, there is a Cartesian plane display section 1101, allowing the user to create and control the layout of identifier tags and incorporate or manipulate other data, aspects, elements, Relational Aspects, Interactive Parameters or resources in accordance with various aspects of the present invention. (For convenience and to enhance discussion with a familiar project, some of the same identifier tags previously discussed with respect to FIG. 8, are shown in display section 1101). By accessing "Save" sub-menu items under the "File" menu, 1103, or otherwise, the user may save templates capturing such layouts, data, interactive parameters, work-flow, Element Seeding or Borrowing, and any other image or image stream aspects of the present invention, including, but not limited to, identifier tags (such as the identifier tag for semi-dynamic black element 1105) and their functions, integrals, parameters, characteristics, Relational Aspects, physical models, derivatives for capturing and rendering images or image streams. In a preferred embodiment, "windows" (such as that depicted as 1107), menu items or sub-items (such as those depicted within sub-window 1109) and a pointing cursor (such as that shown as 1111) are used by a user to instruct the system and aid in carrying out aspects of the present invention, as described below. It is understood, however, that user input through a user interface is not necessary to carry out aspects of the present invention, systems of some of which aspects may perform functions instead by the system alone in response to receiving or gathering input (which may or may not be digital data) into a memory and/or processor.

For example, in one potential aspect of the invention, the user may create a new identifier tag by moving the cursor to hover over and clicking on ("click on") the menu heading "Elements" 1113 and selecting a sub-menu item titled "New Element" (not pictured). Optionally, the user interface might prompt the user to set parameters affecting aspects (such as more basic or necessary aspects of the tag to be created, such as its size, and whether it is to be dynamic (relating to a dynamic element in the image to be created)). But the user (provided adequate permissions and interface tools) generally may resize or define the image or other data source, aspect, relationship or attribute even after such a tag is created, with other transformational tools, such as those pictured as click menu 1115, which may appear when the user clicks on an element identifier tag. Preferably, the user would access such a menu with a right mouse button, or other alternate mouse button click, or double-click, while restricting single primary mouse button clicks to allow repositioning, resizing, and other such aesthetic layout transformations. Once executed, the "New Element" command stream might create a visible box on the Cartesian work space, such as the box marking identifier tag 1105. Other shapes may be used, however, especially to indicate element parameters, attributes, aspects and boundaries and transformations, Interactive Aspects and Relational Aspects commanded by the user.

Turning to the click menu 1115 in more detail, various aspects of a user interface can be understood. First, the user may set the nature of the element tag as a Dynamic Element or Fixed Element through subpanel controls 1117-1123, and, if set as a Dynamic Element (via clicking on control 1117, which indicates if selected by a check-box), may associate source information, such as an image library that will be dynamically matched with an associated database to create an image, series or images or image stream, using drop-carrot selection control 1119. Preferably, the drop carrot window would then change its appearance to indicate such libraries and sources selected. If the user selects a Fixed element source using control 1121 (which also indicates if selected), he or she may further specify a particular source for the fixed image element to be created by the tag, using source selection drop carrot 1123. The source selection tools may allow the user to navigate a file storage or other operating system aspect, to locate sources, which may be inside or outside the system, image formatted or streaming or direct representational or optical or analog in nature, among other things, and may include Element Seeding or Borrowing. The user may set various Relational Aspects using click menu 1115, including but not limited to those pictured, such as layering of representational elements via controls 1125-1129, to be created by identifier tags, including the one subject to the particular click menu 1115, summoned by the user. For example, by selecting the manipulation of the "z-index" of an associated element, using controls 1125 and 1127, and indicating a number (in this example, the z-index number 72 is typed in by a user) the subject element will be placed in a layer above any element with a z-index of 71 or lower, but will be placed below any element with a z-index of 73 or higher in a generated image, set of images and image stream. It is understood that, in other aspects of the invention, any Relational Aspects may themselves be dynamic, changing with a function, such as a time function, or the status of other Relational Aspects impacting the element(s) subject to the tag. For example, through stacking control 1129, the element(s) subject to the tag may be directed to carry a z-index following or leading another element such that, if that other element changes its z-index, the identifier tag 1105 will change with or change the z-index of the "stacked" element accordingly. In another example of Relational Aspects that may be set, a pinning anchor position (in this instance, the element is set to anchor at the most upper-left point(s)) and pinning preference (in this instance, a pinning preference of 7, such that any colliding or otherwise conflicting element with a lower index number will cause the element(s) or subject(s) associated with 1105 to move and/or deform) may be set forth for the element using pinning controls 1131 and 1133. Using Subject Relational Aspect tools 1135 and 1137, the user may define some aspect or object (real or in virtual space) that may assist in generating or rendering representational elements using aspects of the present invention. For example, by selecting a 3-D source with 3-D source tool 1135 (indicated if selected by, for example, an html check box) the user indicates to the system that aspects of the element will be rendered and generated (including aspects affecting other elements and the image, set of images or image stream to be composited and/or generated) according to a 3-D or otherwise multidimensional subject. For example, by further selecting a physical model, with physical model selection tool 1137, a user may, for instance, select a red ball as a 3-D subject, or bouncing red ball as a 4-D subject (including space-time, not just 3 Cartesian coordinates), and, if a 2-D Dynamic Element is to be generated from such a subject, a point in an image stream may, for example, display a shaded circle according to those 3- or 4-D characteristics at the given perspective, time and with the impact of other Relational Aspects.

Various sub-selections within 1137, with physical models for interrelational aspects are possible ("Linked to objects" being shown which would permit the borrowing of physical behavior or characteristics from another element or object), including the definition of objects' affects and impact on one another. In addition, the system may match or deduce environmental information or seed or borrowed data for establishing all or part of a physical model. For example, if an object is defined by a model providing magnetic, gravitational or other potential force-delivering effects, a function describing those effects and leading the tag to represent associated elements according to equations and functions dictating subject object behavior, accounting for interrelationships with other objects according to the physical model. Every know physical effect, force and object and energy principle may be used in descriptive approximations and/or equations of varying realism and processing budgets or from Element Seeding and Borrowing, which may be without encoding or translation, and directly transferred. As discussed previously, Element Seeding or Borrowing may take direct, real injections of image sources or data sources of similar or related objects behavior in the real world, in a dynamic, indexed search and matching system to match objects with real-life or more complex approximation resource libraries. In this way, centralized, potentially remote systems, can stream more accurate texture, physical model, shading and other data, with less impact on the central processor of the system, or client-side terminal, to many similar systems. Alternatively, a local source for a viewing system may apply such Element Seeding or Borrowing, preferably in parts simply used to provide real texture or movement randomness (such as in Brownian motion) into the image, image series or stream of generated images.

Regardless of whether Element Seeding or Borrowing is used, and regardless of whether the system processor runs programs within the system for generating and applying physical models to elements managed by identifier tags, the physical models are preferably those with the greatest verisimilitude and lowest processor work requirements. For example, while Newtonian and Relativistic equations can be highly accurate as part of physical models, Newtonian equations can be complex as applied and inaccurate, particularly in the aggregate, and Relativistic equations require a great deal of processing power. Preferably, a generalized space occupying inter-collision model may be used as a physical model, with different objects, strengths and momentum vectors described (hereinafter, the "Unified Model" model). In such a Unified Model, it is taken that all forces, including gravity, electromagnetism and the weak and strong nuclear forces, are simply the net or secondary effect of objects or waves with momentum or inertia occupying space and colliding, rubbing or passing through one another, and transferring energy in the process. Preferably, in a Unified Model, gravity, electromagnetism and the weak and strong nuclear forces are themselves a shadowing effect from ambient, abundant or ubiquitous radiation or moving particles. In the instance of gravity, the inter-colliding particles and/or waves may be represented or objectified to travel at or near the speed of light, which may allow the ubiquitous concentration of such EM or particles in different reference frames—as with the ubiquitous universal background microwave radiation, which is relatively uniform in all frames of reference despite differing velocities through space. Thus, a Unified Model describes forces applied at a distance as actually the effect whereby two or more objects block ambient activity from one another, with the net effect of greater force on the outside surfaces than the inside surfaces, which are protected from a greater concentration of colliding waves or particles occurring outside of the pair of objects in space, one object shielding the other, and causing an overall attraction effect.

Whether or not a Unified Model is actually the cause of gravity and other unexplained extant physical forces, it can be more efficient for the system to use one concept, of element collision and physical interference, rather than several functions with differing constants (such as wind resistance and collision forces for some objects and tensile strength based on the colligative nature of covalent bonds or the gravitational constant G in the well-known Newtonian equation for gravity, $F=GMM/r^2$), for others.

Sub-panel control 1139 of click menu 1115 controls the opacity of associated elements, (Relational Aspects of identifier tag 1105). Set to 100% opacity, as pictured, any elements placed in an area overlapping with the associated element in display section 1101, with a lower layering z-index, will be blocked from direct view in a resulting image, set of images or image stream in that overlapping area. If another setting is selected for opacity control 1139, such as, for example, 50% opacity, the evenly distributed amount of light relative to 100% will be reduced accordingly for the element, while permitting the remainder to emanate from the next element below (if itself 100% opaque and, if not, that residual amount of light from lower layers as may pass through). With or without a fraction of light emanating from lower elements, various blending modes between overlapping layers may be selected, such as "overlay" (pictured, which, as one example, requires both multiplication and division of color and shading components in the same overlapping location of the different layers) with blending mode control 1141. In addition to the typical blending modes available in much image editing software, a sampling routine may be used to approximate color and shading levels and adjustments that are required from smaller area (less than the whole of the element produced) to smaller area (for example, sizes of the user's choosing) within the overlapping area to get blend effects similar to what would occur with digital and pixelated sources, when using analog and direct image sources. In addition, the blending mode, or other such Relational Aspects, may be set to vary over time or according to some function, with Dynamic Function control 1143. Yet other examples of possible Relational Aspects are provided in Reflection Source control 1145 and Reflection On control 1147, which, if enabled, permit light emanating from or received by an object or element, respectively, to reflect light. Some controls, such as external light source control 1149, permit the introduction of additional elements, such as a light source, and may permit the user to create the direction, space distribution and elevation of unlimited light sources, as with light direction(s) control tool 1151, or even allow direct simulated photon vector patterns distributed in space, which would not be possible with real light sources (for example, in a 3-D representation of such vectors that includes the interaction of boundaries of an element or subject object). As mentioned elsewhere in this application, it is within the scope of the invention that any element, aspect, data source, Relational Aspect, source object, and other thing that may be set by the system, and identifier tags in particular, may be done in multiple instances and sets, as by the "Add" html button 1153, which allows the user to add an additional light source, and would create a new panel to the user interface, with a new external light check box control and directional or 3-D location indicator for the light source (not pictured). Text control sub-panel 1155 of click panel 1115 allows the user to add a text element to be controlled, conditioned and placed by the accessed identifier tag, 1105, in this instance. The text may either be entered directly, by clicking on text entry space 1157, or user-variably keyed to a source, such as a database or streaming source, which may be made for creating a fixed text element (e.g., by clicking a fixed text selection tool 1161) or a dynamic text element (e.g., using dynamic text selection tool 1159, and selecting a column with the desired textual cell contents (selector not pictured) for each image, image within an image set or point in an image stream). Various conditions, layouts and effects may be added to the text, including Relational Aspects that allow the text to be oriented in any spatial configuration relative to another element. For example, the user may select that the text be oriented to the upper-right of the element, as pictured, with orientation selector 1163, or may dictate a direction for the text to lean, pitch or yaw (which may include 3D text effects) as with lean control 1165. With a pixel margin selector, 1167, the user may further dictate a distance between the text and the element to be created, in addition to the given angle and orientation, and, by using negative numbers, may place the text directly over another element controlled by the identifier tag. The text and any associated other element may have any relational aspect between one another as they may have with other elements. Justification and alignment controls such as 1169, Bold, Underline and Italics buttons 1171 and font size selector 1173 are among the text parameters and conditions that may be applied to the resulting text.

As discussed elsewhere in this application, any Relational Aspect set by the user may vary over time or over a function (such as interdependence on the activities or existence of other elements or subject objects, as in a physical model). The physical models themselves or other Relational Aspects may be set to change over a time or other function by Dynamic Function control 1143.

It is understood that, in addition to impacting one another, identifier tags and their associated elements may cause the creation or removal of identifier tags, including multiple identifier tags, in some instances multiplying, dividing and creating or deleting existing tags by other mathematical functions, as dictated for efficiency and realism by the system to add pixel, or similar block elements, with greater resolution in particular regions, especially dynamic element intensive regions—which may be implemented by the system itself as well as by a user.

The creation of new elements may also be carried out with various painting and other image creation tools, such as paint brushes and other drawing, blending and interrelational aspect tools, a few of which are shown in tool panel 1175, including a pointing/movement selection tool 1177, a paintbrush tool 1179, a color fill tool 1181, and a color selector 1183. Each of these tools may be used either in the Cartesian space for design (pictured as 1107) or in alternate views. In this way, accessing and creating tags may be more user friendly, especially in conjunction with a preview window view mode (not pictured), accessible, for example, by clicking on the "Preview" menu item 1185, which would present the elements to be created, or visual approximations thereof, to be painted or affected with instantaneous image appearance feedback for the user. To illustrate the state of dynamic elements in such a view mode, a dynamic symbol or symbols may be used, or a time or function selection or scroll tool (not pictured) would permit the user to summon the element appearances or sound at a particular point or segment in time or other function, in an image set or stream (preferably, with an user-optional opaque rendering of any movement path for the dynamic object also pictured). Optionally, the controls discussed above could be actuated by "on screen" manipulation of elements both in the Preview and Cartesian design viewing modes. For example, the user may be able to change the light source angle by gripping and moving a light source element, as well as elevating or lowering a control point out and into the page, along a z-axis, with instantaneous viewing of the resulting difference in light, reflections and shading in the preview view mode.

The user may determine when to generate images, a set of images, or an image stream with menu items, as well as dictate other administrative and organizational tasks, such as output delivery location, database sources and types, and move the contents of one database to another, using, for example, menu items such as some pictured as 1109.

Figure 12:
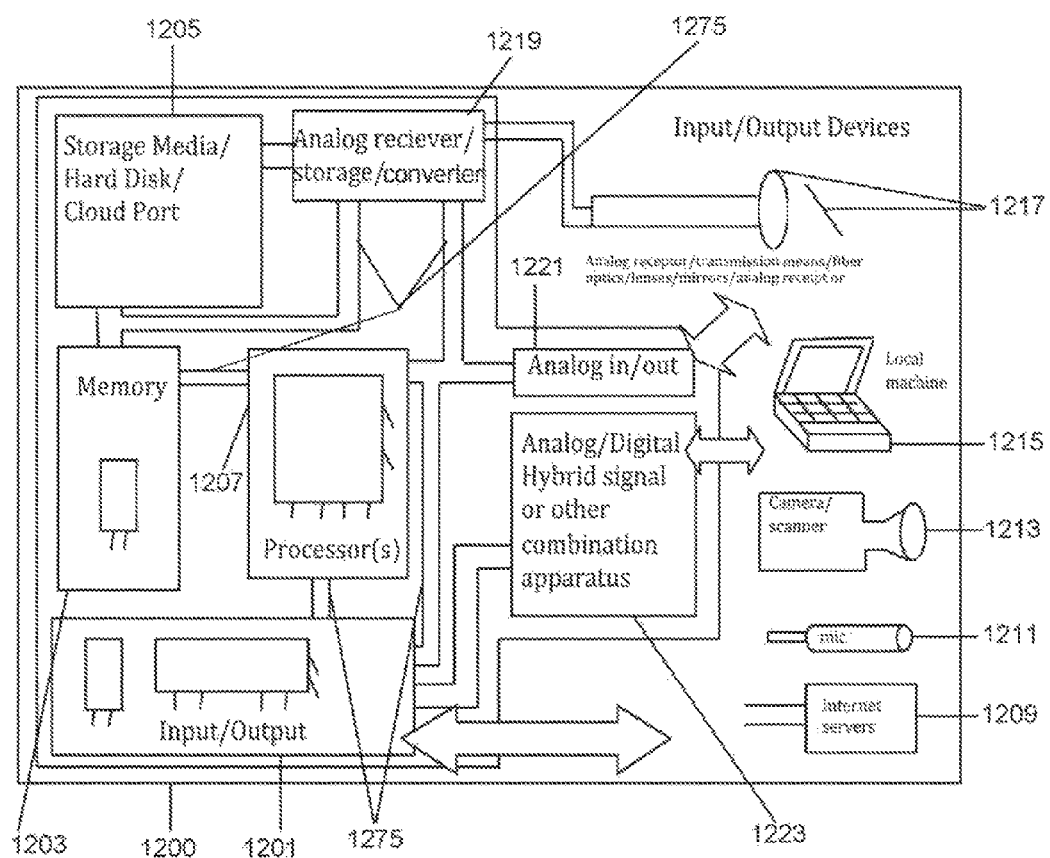
FIG. 12 is a block diagram of some elements of a system in accordance with aspects of the present invention.

FIG. 12 is a schematic block diagram of some elements of a system 1200 that can be used in accordance with aspects of the present invention. The generic and other components and aspects described are not exhaustive of the many different systems and variations, including a number of possible hardware aspects and machine-readable media that might be used in accordance with the invention. Rather, the system 1200 is described here to illustrate how aspects may be implemented. Among other components, the system 1200 includes an input/output device 1201, a memory device 1203, storage media and/or hard disk recorder and/or cloud storage port or connection device 1205, and a processor or processors 1207. The processor(s) 1207 is (are) capable of receiving, interpreting, processing and manipulating signals and executing instructions for further processing and for output, pre-output or storage in and outside of the system. The processor(s) 1207 may be general or multipurpose, single- or multi-threaded, and may have a single core or several processor cores, including microprocessors. Among other things, the processor is capable of processing signals and instructions for the input/output device 1201, analog receiver/storage/converter device 1219, and/or analog in/out device 1221, to cause a user interface to be provided for use by a user on hardware, such as a personal computer monitor or terminal monitor with a mouse and keyboard, including user interfaces discussed above, with respect to FIGS. 2, 8 and 11. The processor 1207 is capable of processing instructions stored in memory devices 1205 and/or 1203 (or ROM or RAM), and may communicate via system bus(es) 1275. Input/output device 1201 is capable of input/output operations for the system, and may include innumerable input and/or output hardware, such as a computer mouse, keyboard, networked or connected second computer, camera or scanner, mixing board, real-to-real tape recorder, external hard disk recorder, direct image transfer or analog devices, additional movie and/or sound editing system or gear, speakers, external filter, amp, preamp, equalizer, computer display screen or touch screen. Such a display device or unit and other input/output devices could implement a user interface, such as those discussed above, in reference to FIGS. 2, 8 and 11. 1201, 1203, 1205, 1207, 1219, 1221 and 1223 are connected and able to communicate communications, transmissions and instructions via system bus(ses) 1275. Storage media and/or hard disk recorder and/or cloud storage port or connection device 1205 is capable of providing mass storage for the system, and may be a computer-readable medium, may be a connected mass storage device (e.g., flash drive or other drive connected to a U.S.B. port or Wi-Fi) may use back-end (with or without middle-ware) or cloud storage over a network (e.g., the internet) as either a memory backup for an internal mass storage device or as a primary memory storage means, or may simply be an internal mass storage device, such as a computer hard drive or optical drive. Generally speaking, the system may be implemented as a client/server arrangement, where features of the invention are performed on a remote server, networked to the client and made a client and server by software on both the client computer and server computer.

Input and output devices may deliver their input and receive output by any known means, including, but not limited to, the examples shown as 1209, 1211, 1213, 1215 and 1217. Because the images managed, manipulated and distributed may be any representational or direct impression or transfer captured from any activity, any phenomenon that may be sensed may be managed, manipulated and distributed may be taken or converted as input through any sensor or carrier known in the art. In addition, directly carried elements (for example a light stream taken by fiber optics from a view of a scene) may be directly managed, manipulated and distributed in whole or in part to enhance output, and whole ambient light or or other phenomena information may be taken by a series of sensors dedicated to angles of detection, or an omnidirectional sensor or series of sensors which record direction as well as the presence of photons, compression waves or other directional and present phenomena recorded, and may exclude the need for lenses (or ignore or re-purpose sensors "out of focal plane" for detecting bokeh information or enhancing resolution as focal lengths and apertures are selected), only later to be analyzed and rendered into focal planes or fields of a user's choice through the system. For example, a series of metallic sensor plates that resonate with photons propagating in particular directions would also be capable of being recorded with directional information, in addition to other, more ordinary light data recorded by sensors. While this example is illustrative, it is understood that any form of electromagnetism, compression wave or other sensory phenomenon may include such sensory directional and 3D locational information, which may also be made possible by multiple locations of sensing, preferably, in a similar, if not identical, time frame. Through angular analysis of photons originating from a common source element, distances and 3-D countours can be measured and included for elements and element features, and used to develop 3-D and 4-D physical models used by the system. The system may condition, select all or part of, alter and/or generate composites from all or part of such direct or analog image transmissions, and may combine them with other forms of image data, such as digital image files, if such direct or data encoded sources are used.

While the illustrated system example 1200 may be helpful to understand the implementation of aspects of the invention, it is to be understood that any form of computer system may be used—for example, a simpler computer system containing just a processor for executing instructions from a memory or transmission source. The aspects and features set forth may be implemented with, and in any combination of, digital electronic circuitry, hardware, software, firmware, or in analog or direct (such as light-based or analog electronic or magnetic or direct transmission, without translation and the attendant degradation, of the image medium) circuitry or associational storage and transmission, as occurs in an organic brain of a living animal, any of which may be aided with external detail or aspect enhancing media (for component seeding and borrowing) from external hardware and software, optionally, by networked connection, such as by LAN, WAN or the many connections forming the internet. The system can be embodied in a tangibly-stored computer program, as by a machine-readable medium and/or propagated signal, for execution by a programmable processor. The method steps of the embodiments of the present invention may be performed by such a programmable processor, executing a program of instructions, operating on input and output, and generating output. A computer program includes instructions for a computer to carry out a particular activity to bring about a particular result, and may be written in any programming language, including compiled and uncompiled and interpreted languages and machine language, and can be deployed in any form, including a complete program, module, component, subroutine, or other suitable routine for a computer program.

I claim:

1. A system for increasing efficiency and realism in computer management of digital images comprising a first processor and a non-transitory machine-readable medium, which system receives at least one image as input and automatically defines or identifies, and encodes through the use of said processor and said machine-readable medium, at least one of any Fixed Element(s) and at least one of any Dynamic Element(s) within the at least one image;

and wherein said system creates a new composite image incorporating identifier tags in place of at least one of said at least one Fixed Element(s) or Dynamic Element(s), which identifier tags are within a Cartesian coordinate subsystem of a graphical computer display comprised in said system; and which identifier tags are encoded by said first processor for said first processor or a second processor(s) to access image elements and/or aspects and integrate them into a new, composite image.

2. The system of claim 1, in which the system defines or identifies at least one Fixed Representational or Dynamic Representational Element.

3. The system of claim 1, in which the system defines or identifies at least one Fixed Element, Dynamic Element and/or other Element using Variation Toleration.

4. The system of claim 1, in which the system identifies Fixed Element(s), Dynamic Element(s) and/or other Element(s) by associating (an) identifier tag(s) with them.

5. The system of claim 4, in which the identifier tag(s) generate image element(s) and the system generates at least one image, after associating identifier tag(s) that reflect(s) or incorporate(s) said generated image element(s).

6. The system of claim 5, in which the system incorporates or applies onto said new image an infinitely varying element from a source external to said new image;

wherein the infinitely varying element is a source used to generate textures or other aspects of said new image.

7. The system of claim 6, in which the infinitely varying element uses or comprises an analog image element or an image element directly formed from the emission of light from an imaged object or phenomenon.

8. The system of claim 5, in which the appearance of camera shake is reduced in generated image(s) by the system repositioning identifier tag(s) for Dynamic Representational Element(s), and/or repositioning the generated Dynamic Representational Element(s) themselves, in a more constant position in the generated image(s) than would occur without said repositioning identifier tag(s) and/or said repositioning the generated Dynamic Representational Element(s).

9. The system of claim 5, in which associated data for an identifier tag and its Representational Image Element(s) are taken from multiple image capture instances or points within a captured image stream.

10. The system of claim 5, in which a 3-dimensional subject is built for at least one element by determining angles of light relative to a camera(s) or other sensor(s), and light source points or source areas, of light captured within the at least one image.

11. A system comprising a first processor and a non-transitory machine-readable medium which creates, modifies or uses at least one identifier tag configured to cause Fixed Elements, Dynamic Elements and/or other Elements to be included in an image or image stream generated by the system, and in place of other elements, other than said Fixed Elements, Dynamic Elements, or tag(s), in other versions of the image or image stream;
wherein said at least one identifier tag is within a Cartesian coordinate subsystem of a graphical computer display comprised in said system; and which identifier tag is encoded by said first processor for said first processor or a second processor(s) to access image elements and/or aspects and integrate them into a new, composite image.

12. The system of claim 11, comprising a user interface configured to permit a user to create Fixed Elements, Dynamic Elements and other Elements, and configured to permit a user to include associated data, Interactive Parameters or infinitely varying elements from a source external to said image or image stream with the at least one identifier tag.

13. The system of claim 11, in which the system is configured to incorporate a 3-D or 2-D subject as associated data with at least one identifier tag.

14. The system of claim 11, configured to associate a physical model with an Image element, or a 2-D or 3-D subject of said Image element.

15. The system of claim 12, in which the user interface is configured to set Interactive Parameters for identifier tag(s) and elements that said identifier tags are configured to produce.

16. The system of claim 12, in which the system is configured to permit a user to associate a database with said at least one identifier tag and/or said image or image stream, which database includes different data for each image within a series of images or each point within an image stream.

17. The system of claim 16, in which the system is configured to permit a user to set an Interactive Parameter for at least one identifier tag permitting the co-occupation of space and orientation of at least two Representational Image Elements, which includes at least one Dynamic Representational Element, as the size or other physical characteristics of said Dynamic Representational Element may vary from image-to-image within a series of images, or from point-to-point within an image stream.

18. The system of claim 17, in which a first Representational Image Element comprises at least one image-based image element, and a second Representational Image Element comprises at least one text-based image element.

19. The system of claim 16, in which the system creates at least one dynamic image element identifier tag which may match data from a row or part of a database corresponding with images in an image library to produce an image element for each image within a series of images or each point within an image stream.

20. The system of claim 11, in which the system is configured to, or in which the system is configured to permit a user to, interpose computer-generated objects for 2-D or 3-D subjects of dynamic element identifier tags.

* * * * *